United States Patent [19]

Nomura et al.

[11] Patent Number: 5,689,379
[45] Date of Patent: Nov. 18, 1997

[54] INNER GEAR, CYLINDRICAL PRODUCT WITH INNER GEAR, MOLD FOR INNER GEAR, MOLD FOR CYLINDRICAL PRODUCT WITH INNER GEAR, METHOD OF MANUFACTURING INNER GEAR, AND METHOD OF MANUFACTURING CYLINDRICAL PRODUCT WITH INNER GEAR

[75] Inventors: Hiroshi Nomura; Takamitsu Sasaki, both of Tokyo, Japan

[73] Assignee: Asahi Kogaku Kogyo Kabushiki Kaisha, Tokyo, Japan

[21] Appl. No.: 358,812

[22] Filed: Dec. 19, 1994

[30] Foreign Application Priority Data

| Dec. 20, 1993 | [JP] | Japan | 5-320481 |
| Feb. 18, 1994 | [JP] | Japan | 6-021632 |
| Mar. 2, 1994 | [JP] | Japan | 6-032663 |
| Mar. 2, 1994 | [JP] | Japan | 6-032664 |

[51] Int. Cl.⁶ .................................................. G02B 7/02
[52] U.S. Cl. .................................................. 359/829
[58] Field of Search .................. 74/424.5, 424.6; 354/195.1, 195.12, 400, 274, 254, 259, 260; 425/438, 441, DIG. 58; 428/35.7, 36.9, 179; 359/829

[56] References Cited

U.S. PATENT DOCUMENTS

| 3,888,568 | 6/1975 | Norris et al. |
| 4,105,390 | 8/1978 | Hehl |
| 4,362,291 | 12/1982 | Fuke et al. ............... 249/144 |
| 5,144,493 | 9/1992 | Nomura |

FOREIGN PATENT DOCUMENTS

| 0052581 | 10/1981 | European Pat. Off. |
| 560414 | 10/1942 | United Kingdom. |
| 757338 | 9/1952 | United Kingdom. |
| 947366 | 12/1960 | United Kingdom. |
| 1134777 | 3/1967 | United Kingdom. |
| 1521154 | 6/1975 | United Kingdom. |
| 1592207 | 10/1977 | United Kingdom. |
| 2205522 | 7/1988 | United Kingdom. |

*Primary Examiner*—Georgia Y. Epps
*Assistant Examiner*—Thomas Robbins
*Attorney, Agent, or Firm*—Greenblum & Bernstein P.L.C.

[57] ABSTRACT

A cylindrical product with an inner gear formed by injection molding, a mold for the cylindrical product, and a method of manufacturing the same are disclosed. The molded product may include a cylindrical base member, a spiral inner gear formed on an inner peripheral surface of the cylindrical base member so as to be inclined to a circumferential direction of the cylindrical base member, and a spiral relief groove formed on the inner peripheral surface of the cylindrical base member adjacent to the inner gear. The relief groove may be wider than a tooth width of the inner gear. The method of manufacturing the cylindrical product includes the steps of inserting a first cylindrical mold into a hole at the center of a second cylindrical mold, engaging a toothed portion on the first cylindrical mold with a spiral groove on the second cylindrical mold to provide a lower mold, mounting an upper mold thereon to form a space for forming the cylindrical product, injecting molten resin material into the space to harden it therein, withdrawing the second cylindrical mold in a direction to allow the mold to be opened, axially moving the first cylindrical mold to insert the toothed portion into a relief groove on a flat portion of the second cylindrical mold, rotating the first cylindrical mold in a direction to withdraw it along the flat portion, and removing the upper mold to extract the cylindrical product.

12 Claims, 29 Drawing Sheets

INNER GEAR, CYLINDRICAL PRODUCT WITH INNER GEAR, MOLD FOR INNER GEAR, MOLD FOR CYLINDRICAL PRODUCT WITH INNER GEAR, METHOD OF MANUFACTURING INNER GEAR, AND METHOD OF MANUFACTURING CYLINDRICAL PRODUCT WITH INNER GEAR

BACKGROUND OF THE INVENTION

1. Field of the Invention

The present invention relates to a cylindrical product with an inner gear formed by injection molding, a mold for the cylindrical product, and a method of manufacturing the same.

2. Description of the Related Art

A zooming lens barrel is often provided with several types of rotation cylinders for the zooming and focusing operations. In the zooming lens barrel the present applicant has been developing, a rotation cylinder is used to move first and second cylindrical members accommodated therein in an optical axis direction and to transmit rotation to the first and second cylindrical members. The rotation cylinder moves the first cylindrical member back and forth in the optical axis direction, and the rotation is transmitted to the second cylindrical member by an inner gear formed on an inner peripheral surface thereof through gears and the like which move in optical axis direction together with the first cylindrical member.

In the above-mentioned construction, however, when the inner gear is formed over the whole inner peripheral surface of the rotation cylinder, cam grooves and the like cannot be formed on the same inner peripheral surface. Therefore, a more appropriate shape of a rotation cylinder with a more appropriate shape of an inner gear has been keenly sought furthermore, a mold for forming the rotation cylinder with such an inner gear from a resin material which can be easily made, and a method of manufacturing the cylinder and mold is desired.

Generally, a metal mold of an injection molding device for a cylindrical object with undercuts such as an inner gear at the inner periphery thereof, is provided with inner slide cores which are divided into 4 pieces, 6 pieces or more pieces.

However, in case where the undercuts have the shape of an inner gear, the tips of the teeth of the slide cores are liable to be interfered with by the formed inner gear and other divided inner cores: therefore, it is required to shift the timing when adjacent inner cores are driven or to change the velocities that the inner cores are driven when the metal mold is opened. For the above-mentioned purposes, it is necessary to provide a plurality of driving mechanisms and means for controlling the timing and velocity of the drive, resulting in an overall complicated construction of the injection molding machine.

There is a problem about the positions of parting lines of the inner slide core. To increase the thickness of the mold, it is preferable to avoid using the top tooth surface as a parting line and to select the bottom of the teeth to position the parting lines. However, it has been difficult to provide all of the parting lanes at the bottom of the mold in relation to the pitch of the inner teeth.

Further, when inner cores are drawn in a radial direction of the inner gear (toward the axis of the inner gear) and the inner gear has, for example involute teeth, the shoulders of the inner cores ere interfered with by the bulged portions of the teeth.

SUMMARY OF THE INVENTION

Accordingly, a first object of the present invention is directed to providing a cylindrical product with a more appropriate shape of an inner gear, a mold for forming the cylindrical product, and a method of manufacturing the cylindrical product and mold.

A second object of the present invention is to provide an injection molding machine for a product with undercuts, such as an inner gear, without using a special control means.

The third object of the present invention is to provide an inner gear and a metal mold for an injection molding machine. The construction of the mold for the injection molding machine, the driving mechanism and the driving control are simplified.

The fourth object of the present invention is to provide an inner gear which can be manufactured through injection molding even if there are undercuts present on the inner gear.

A molded product according to the present invention in order to accomplish the first object described above may include a cylindrical me member, a spiral inner gear formed on an inner peripheral surface of the cylindrical base member so as to be inclined to a circumferential direction of the cylindrical bass member, and a spiral relief groove formed on the inner peripheral surface of the cylindrical base member adjacent to the inner gear, the relief groove is larger than the diameter of the inner gear and wider than the tooth width of the inner gear.

According to another aspect of the present invention, a mold for forming a product of the present invention may include an upper mold for forming an outer surface of the product and a lower mold for forming an inner surface of the product. The lower mold may include a first cylindrical mold with a spiral toothed portion for the inner gear, and a second cylindrical mold with a spiral flat portion for the relief groove.

As a further aspect, of the present invention may further include a spiral lead groove formed on the inner peripheral surface of the cylindrical base member so as to be parallel to the inner gear.

In this case, the product may further include a mold for forming a cylindrical product having an upper mold for forming an outer surface of the product and a lower mold for forming an inner surface of the product. The lower mold may include a first cylindrical mold with a spiral toothed portion for the inner gear, and a second cylindrical mold with a spiral flat portion for the relief groove and with a spiral protrusion for the lead groove.

The first cylindrical mold may further include a cylindrical portion with a small diameter; and a spiral portion with a larger diameter than the cylindrical portion with e small diameter. The toothed portion being formed on an outer periphery of said spiral portion, and the second cylindrical mold includes a hole at a center thereof for engaging the cylindrical portion with the small diameter, and a spiral groove accommodating the spiral toothed portion.

Another aspect of the present invention is a method of manufacturing a cylindrical product that may include the steps of combining an upper mold that may include a first cylindrical mold with a spiral toothed portion for the inner gear and a second cylindrical mold with a spiral flat portion for the relief groove, and a lower mold for forming an inner surface of the product, injecting a resin material into a space enclosed by the upper and lower molds, rotating the second cylindrical mold to separate it from the upper mold after the resin material in the space is hardened, axially moving the first cylindrical mold to cause the toothed portion to be separated from the upper mold and to be positioned in the relief groove, and rotating the first cylindrical mold to separate it from the upper mold.

A mold for injection molding according to the present invention to accomplish the second object described above include a plurality of sets of first and second inner slide cores, inner molds with undercut forming portions of the first and second inner slide cores adjacent to each other constituting one set of the first and second inner slide cores. The first and second inner slide cores may move in a direction perpendicular to a center line of the inner cores at different velocities from each other to open and close the inner cores, satisfying the formula:

$$\theta_F \leq \theta_E \leq \theta_A, \quad (1)$$

where, $\theta_E$ designates an angle between a pair of parting surfaces and a slide line of the first inner slide core at a position where the first and second inner slide cores close tame inner molds, $\theta_F$ designates a smallest angle to cause the pair of parting surfaces of the first and second inner slide cores not to interfere with each other at positions other than the closed position and partially closed positions, and $\theta_A$ designates a largest angle to cause the undercut forming portions of the second inner slide core not to interfere with the first inner slide core when the first and second slide cores move while they are opened and closed.

In one embodiment, a product formed by the inner molds is a cam ring with an inner gear with undercuts, the parting surfaces of the first and the second inner slide cores are formed through tooth roots of an inner gear forming portion, and the largest angle $\theta_A$ is a largest angle to allow tips of the second inner slide core not to interfere with the first inner slide core when parting surface lines of the first and the second inner slide cores are formed on the tooth roots.

In another embodiment, the first and the second inner slide cores are slidably supported so as to move close to and apart from a fixed plate at a predetermined angle $\theta_c$ in a direction perpendicular to the center line. The inner molds being closed when the first and the second inner slide cores reach an outermost position.

In another case, a product formed by the inner molds is a cam ring with an inner gear with undercuts. A number of teeth of the inner gear is determined based on a number of divided first and second inner slide cores.

In yet another case, a product formed by the inner molds is a cam ring with an inner gear with undercuts. A tooth form of the inner gear is formed by lines resembling an involute. Further the inner molds do not interfere with each other when the inner cores are driven so as to be open and closed.

The mold for injection molding may further include a lock core slidably guided in a direction parallel to the center line to a space enclosed by inner peripheral surfaces of the first and the second inner slide cores. When the lock care is inserted into the space, the lock core presses and maintains each of the first and the second inner slide cores at a closed position where contact surfaces of the first and the second inner slide cores contact each other. When retracting the lock core, the lock core permits the first and the second inner slide cores to be open.

In this case, the lock core is secured to a movable plate. Angular pins, which are slidably inserted into guide holes on the first and the second inner slide core, are secured to the movable plate. When the movable plate is moved, each of the angular pins, which are secured at predetermined angles $\theta_D$, $\theta_E$ with respect to the center line, move the first and the second inner slide cores in a direction that opens end closes the first and the second inner slide cores at different velocities with respect to each other, thus, simultaneously satisfying the formulas:

$$\tan\theta_D \leq \tan\theta_E - \cos\theta C, \quad (4)$$

where, $\theta_c$ designates an angle between slide lines of the first and the second inner slide cores.

In this case, a smallest angle $\theta_F$ satisfies the formula:

$$\theta_F = \tan^{-1}(\sin\theta_c - \tan\theta_E/(\tan\theta_E - \cos\theta_c - \tan\theta_D))$$

where, $\theta_c$ designates an angle between slide lines of the first and the second inner slide cores, $\theta_D$ designates an angle between the angular pin of the first inner slide core and the center line, and $\theta_E$ designates an angle between the angular pin of the second inner slide core and the center line.

An inner gear according to the present invention to achieve a third object described above is formed by a mold for injection molding wi th a plurality of radially moving inner slide cores to open and close the inner molds. The number of teeth of the inner gear is determined based on the number of divided inner slide cores.

In one case, the inner slide cores include a plurality of sets of first and second inner slide cores. One set of the plurality sets of first and second inner slide cores may include first and second inner slide cores which are adjacent to each other and radially move at different velocities with respect to each other to open and close the inner molds.

Preferably, the number of teeth of the inner gear is determined by the following formula:

$$Z = (S/2) \cdot n \quad (2)$$

where, S designates a number of divided inner slide cores, Z designates a number of teeth of the inner gear, and n designates a positive integer which is selected from even numbers in consideration of gears meshing with inner gears, as discussed below.

In the embodiment above if n was less than 14, the shape of the gear would not he an involute. If n was greater than 18, the inner molds would be too small. Therefore, n is selected depending upon the particular design considerations.

A mold for injection molding according to the present invention having a plurality of radially moving inner slide cores to open and close inner molds, and the number of teeth of the inner gear is determined based on the number of divided inner slide cores.

In one case, the inner slide cores include a plurality sets of first and second inner slide cores. One set of the plurality of sets of first and second inner slide cores may include first and second inner slide cores which see adjacent to each other and radially move at different velocities with respect to each other to open and close the inner molds.

An inner gear according to the present invention to achieve the fourth object described above is formed by a mold with a plurality of radially moving inner slide cores to open and close inner molds and the tooth from of the inner gear is formed such that the inner molds do not interfere with each other when they are driven so as to be open and closed. In this case, it is possible to form the tooth form of the inner gear to resemble an involute.

Preferably, the tooth form of the inner gear is formed by lines resembling an involute.

In one case, the teeth of the inner gear extend in a direction parallel to an axis of the inner gear, and the surfaces of the teeth are substantially flat.

The present disclosure relates to subject matter contained in Japanese patent application Nos. 05-320481 (filed on Dec. 20, 1993), 06-21631 (filed on Feb. 18, 1994), 06-32663 (filed on Mar. 2, 1994) and 06-32664 (filed on Mar. 2, 1994) are expressly incorporated herein by reference in their entireties.

BRIEF DESCRIPTION OF THE DRAWINGS

The present invention will be more apparent from the ensuing description with reference to the accompanying drawings wherein.

DESCRIPTION OF THE PREFERRED EMBODIMENTS

Embodiments of the present invention will be explained with reference to the drawings. A zoom lens barrel in a camera according to this embodiment is provided with a zoom lens system uprising of a front lens group L1 and a rear lens group L2. The focusing operation is carried out by the front lens group L1.

Figure 7:
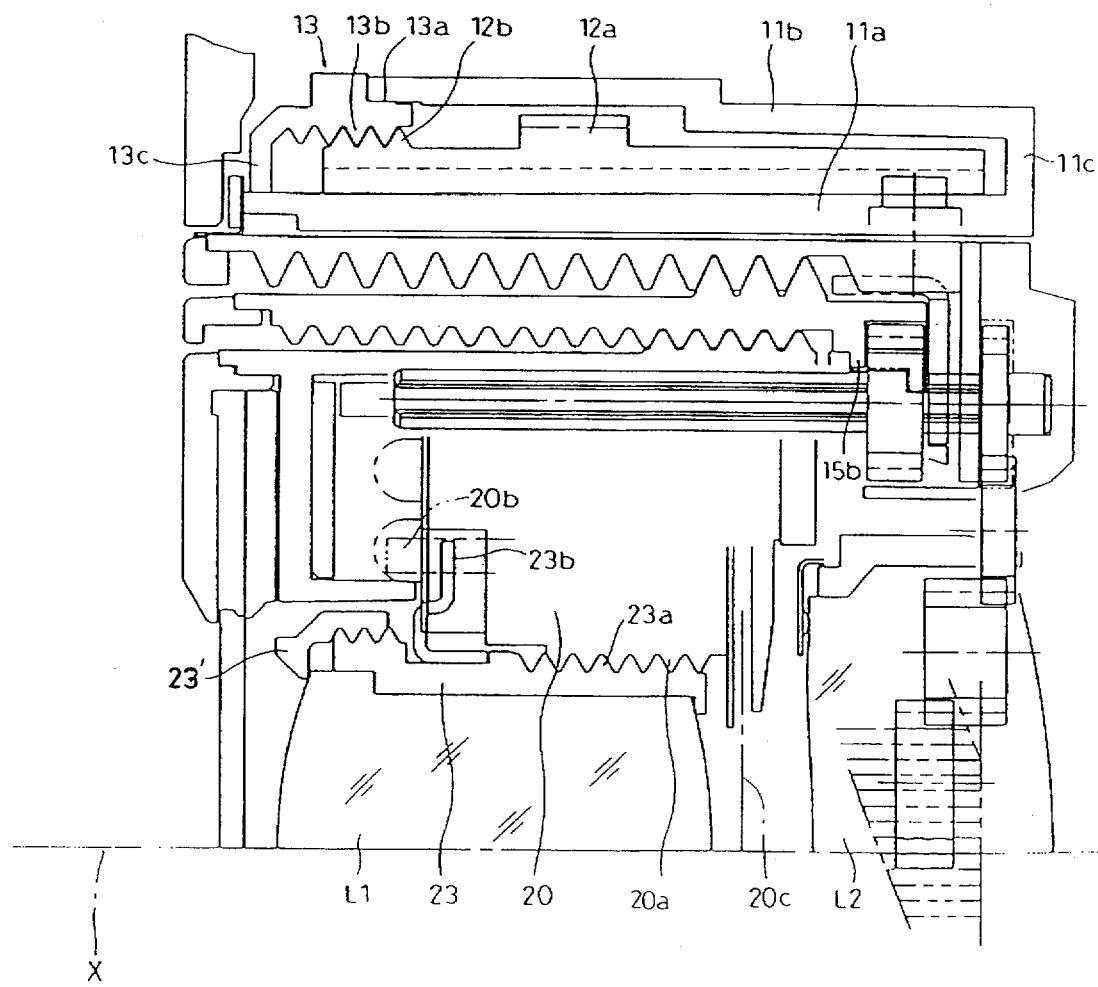
FIG. 7 is a lateral cross-sectional view of the upper half of the accommodated zoom lens barrel according to the present invention.
Figure 8:
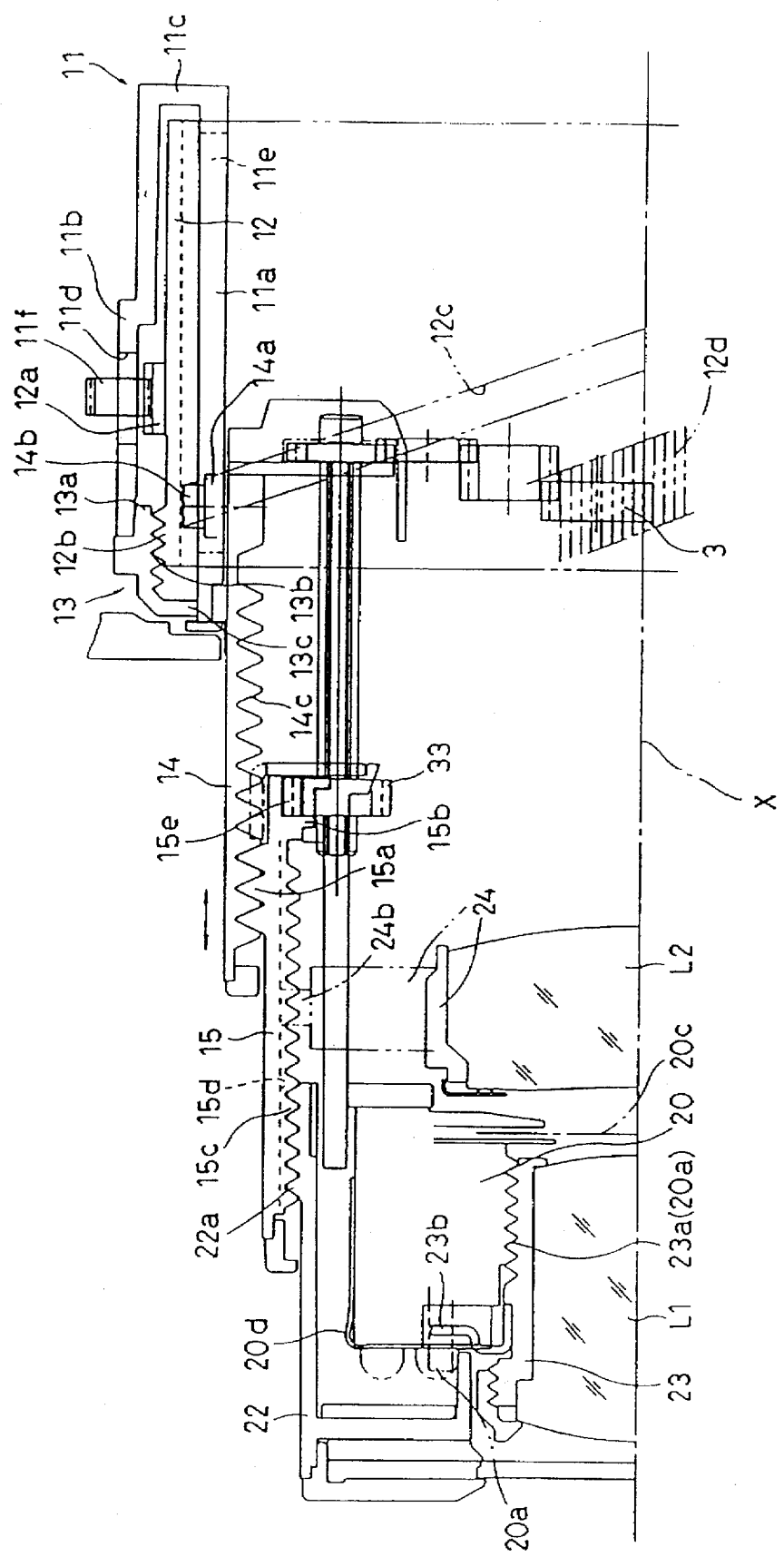
FIG. 8 is a lateral cross-sectional view of the upper half of the extended zoom lens barrel according to the present invention.

Referring to FIGS. 7 and 8, a fixed lens barrel 11 of the zoom lens barrel 9 secured to a camera body 10 to which the present invention is applied is provided with an inner cylinder 11a and an outer cylinder 11b. Rear ends of the inner cylinder 11a and the outer cylinder 11b in the direction of an optical axis X of the zoom lens system are connected to each other through the connecting wall 11c, and the front ends of the cylinders 11a and 11b are open. A rotation cylinder (i.e., cylindrical product) 12, which is inserted from the open end of the cylinders 11a, 11b, is rotatably mounted on the outer periphery of the inner cylinder 11a. Three straight guide grooves 11e, each extending in a direction parallel to the optical axis X are formed on the inner wall 11a. Only one of the three straight guide grooves 11e is shown in FIG. 8.

Figure 9:
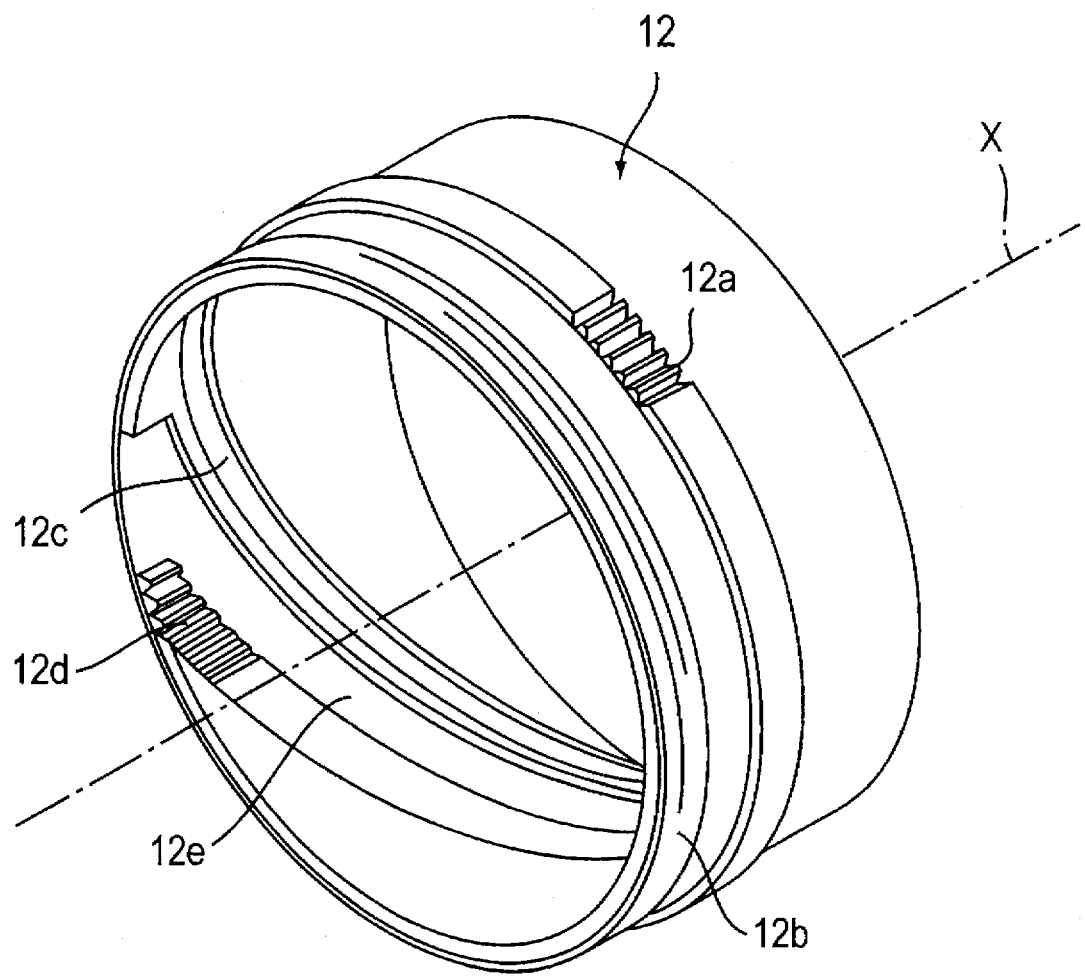
FIG. 9 is a isometric view of a rotation cylinder corresponding to a cylindrical product according to the present invention.
Figure 10:
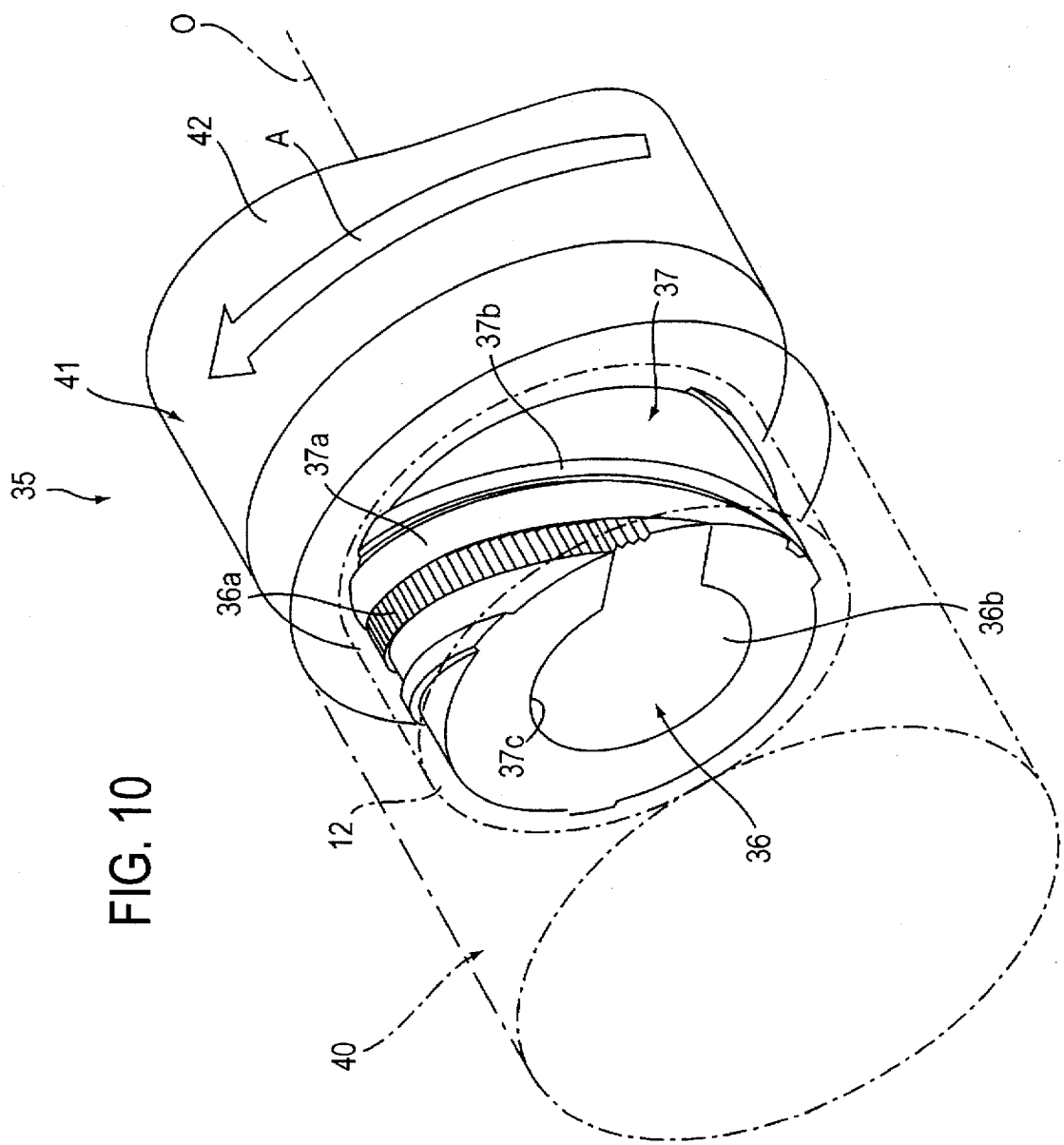
FIGS. 10 to 15 are isometric views showing a manufacturing process for manufacturing the cylindrical product with molds.

The rotation cylinder 12 as a cylindrical product to which the present invention is applied is made of a synthetic resin and a spur gear 12a is integrally formed with the cylinder 12 on an outer periphery thereof as illustrated in FIG. 9. A fine thread 12b is integrally formed with the cylinder 12 at a tip of the outer peripheral portion thereof. On the inner wall of the rotation cylinder 12, three spiral lead grooves 12c which are parallel to one another and each inclined to the circumferential direction of the cylinder 12, an inclined spiral inner gear 12d parallel to the lead grooves 12c, and a spiral relief groove 12e are formed. The spiral relief groove 12e is formed in the vicinity of the gear 12d and is larger than the root circle of the inclined inner gear 12d in diameter and wider than the tooth width of the inner gear 12d.

A support ring 13 is secured to the front end opening of the inner cylinder 11a and outer cylinder 11b of the fixed lens barrel 11. The support ring 13 includes a portion 13a engaging the inner face of the outer cylinder 11b; a thread portion 13b engaging the fine thread 12b; a portion 13c contacting an outer face of the inner cylinder 11a, and an outer flange 13e. The support ring 13 is pressed against the fixed lens barrel 11 by a spring means (not shown) and is held at a predetermined position. Reference symbol 13d is a gear formed on an outer periphery of the support ring 13 for rotating operation. The support ring 13 also functions to strengthen the edge of the inner cylinder 11a and the outer cylinder 11b.

Figure 1:
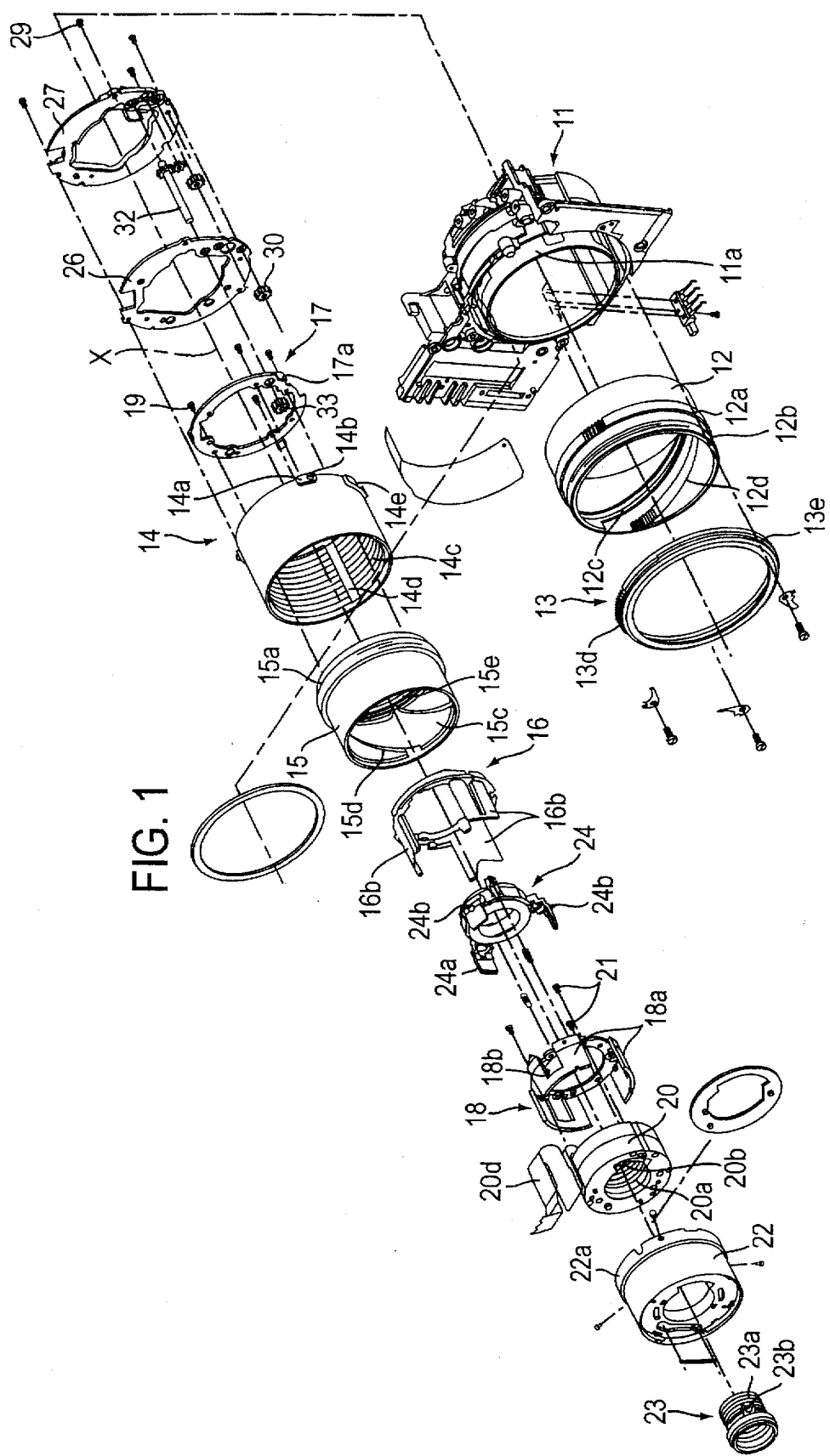
FIG. 1 is an exploded isometric view of a zoom lens barrel according to an embodiment of the present invention.
Figure 2:
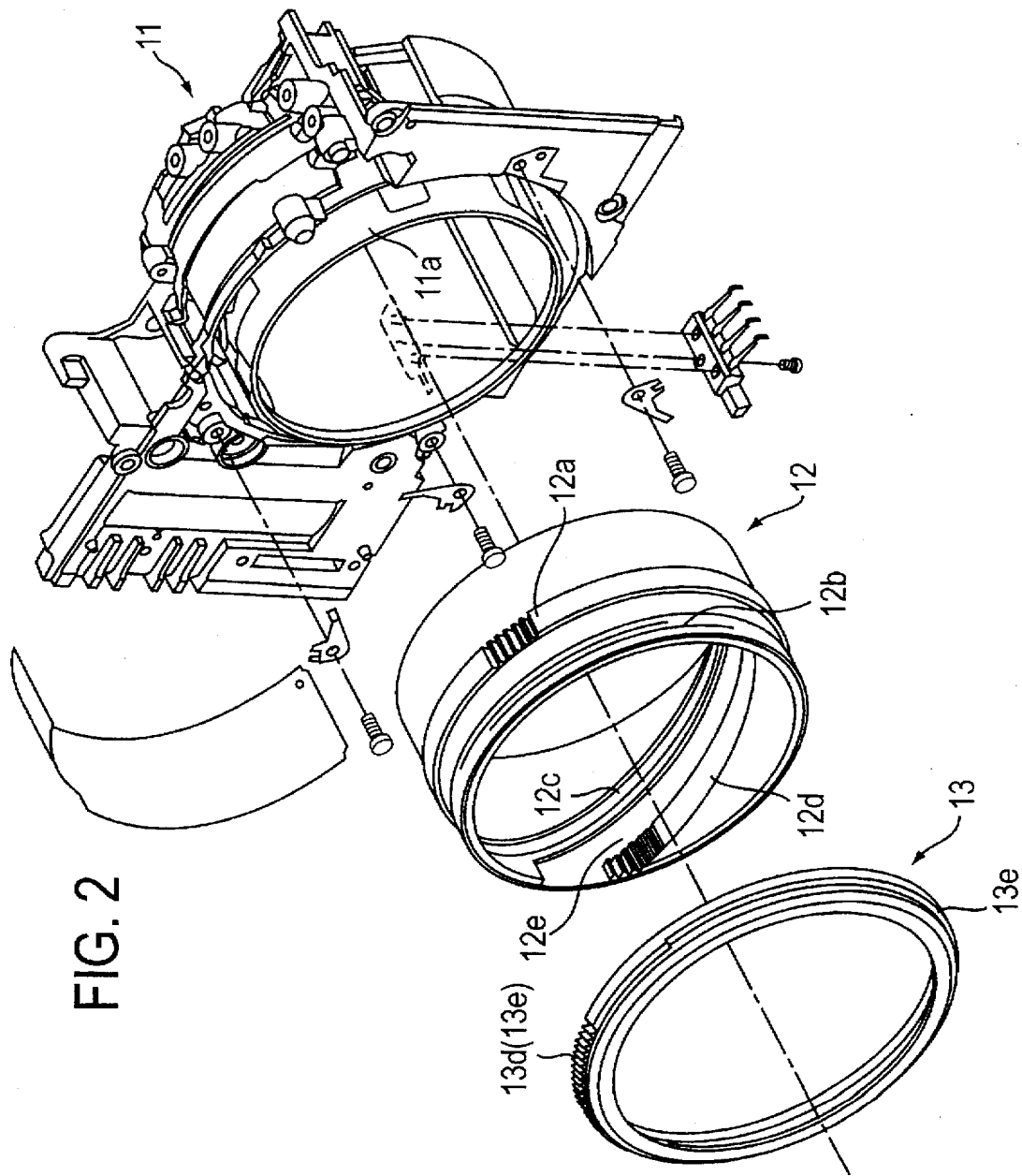
FIG. 2 is an enlarged isometric view of the rear portion of the zoom lens barrel shown in FIG. 1.

A notch 11d for allowing the pinion 11f to mesh with the spur gear 12a is formed on the outer cylinder 11b of the fixed lens barrel 11, and other notches similar to the notch 11d are formed on the inner cylinder 11a to expose the lead groove 12c and the inclined inner gear 12d illustrated in FIGS. 1 and 2.

A first cylinder 14 which moves in the direction of the optical axis X fits in the inner cylinder 11a of the fixed lens barrel 11. Three straight guide projections 14a are formed integral with the outer periphery of the first cylinder 14 and engage the guide grooves 11e of the fixed lens barrel 11. Only one of the three straight guide projections 14a is shown in FIG. 8. A pin 14b engaging the corresponding lead groove 12c of the rotation cylinder 12 is formed on each of the guide projections 14a. Further, a female helicoid 14c and three straight guide grooves 14d parallel to the optical axis are formed on the inner wall of the first cylinder 14. Only one of the three straight guide grooves 14d can be seen in FIG. 3. With the construction described above, the rotation of the rotation cylinder 12 causes the first cylinder 14 to move in the direction of the optical axis X without rotating by means of the guide grooves 11e and the lead grooves 12c.

In the first cylinder 14, a second cylinder 15 is accommodated, and at a rear portion of the outer periphery of the second cylinder 15 is formed a male helicoid 15a engaging the female helicoid 14c of the first cylinder 14. A straight guide member 16 is inserted into the second cylinder 15, and a straight guide plate 17, which is used for supporting, is fixed by fastening screws 19 to a rear portion of the guide member 16. An inner flange 15b is formed integral with the second cylinder 15 between the guide member 16 and the guide plate 17 so as to rotate in relation to the guide member 16 and the guide plate 17 as illustrated in FIGS. 7 and 8. Three straight guide keys 17a formed on the periphery of the guide plate 17 are engaged with a guide groove 14d. As a result, the guide member 16 and the guide plate 17 rotate in relation to the second cylinder 15 and they integrally move in the direction of the optical axis X. In other words, the second cylinder 15 is rotatable and movable in the direction of the optical axis X at the same time by means of the male and female helicoids 15a and 14c on one hand, and on the other hand, the guide member 16 and the guide plate 17 are movable together with the second cylinder 15 in the direction of the optical axis X without rotating.

As illustrated in FIG. 1, the guide member 16 is provided with three straight keys 16b each extending in a direction parallel to the optical axis X. A guide member 18 for linearly guiding the front lens group L1 Is provided with three straight keys 18a engaging the three keys 16b and each extending in a direction parallel to the optical axis X. A shutter block 20 is secured to the front lens group guide member 18 through fastening screws 21 and is further secured to the front lens group supporting cylinder 22. As a result, the shutter block 20 and the front lens group supporting cylinder 22 are prevented from rotating and are allowed to move only in the direction of the optical axis X.

Figure 4:
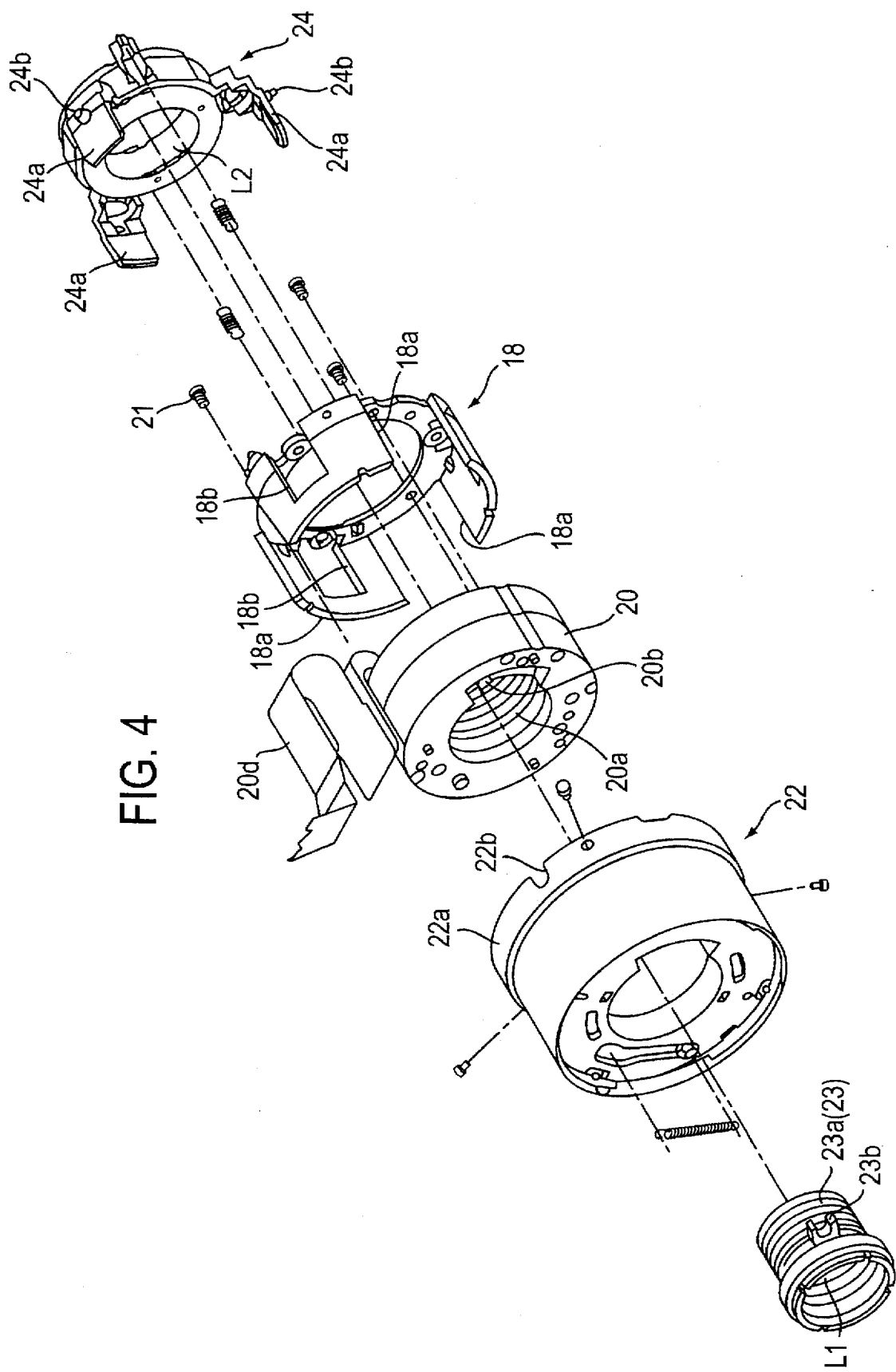
FIG. 4 is an enlarged isometric view of the front portion of the zoom lens barrel shown in FIG. 1.

As illustrated in FIGS. 1 and 4, the shutter block 20 is provided with a female helicoid 20a extending parallel to the optical axis X, and a male helicoid 23a of a lens supporting ring 23 fixing the front lens group L1 is engaged with the female hellcoid 20a. The lens supporting rang 23 and a lens fixing ring 23' engaged with the ring 23 at a front end portion of the ring 23 constitute a front lens frame. At the rear portion of the outer periphery of the front lens group supporting cylinder 22, a male helicoid 22a is formed to move the lens supporting ring 23 in the direction of the optical axis X during a zooming operation. The shutter block 20 is provided with shutter blades 20c, and driving signals are supplied to the shutter block 20 through a flexible printed circuit board (FPC board) 20d.

A rear lens group guiding slot 18b is formed on each of the straight keys 18a of the front lens group guide member 18 for linearly moving the rear lens group L2 in the direction of the optical axis X. The rear lens group L2 is secured to the rear lens frame 24. Three straight keys 24a engaging the rear lens group guiding slots 18b are formed on the rear lens frame 24. A cam pin 24b is formed on each of the keys 24a so as to project in a radial direction therefrom.

A female helicoid 15c and three cam grooves 15d are formed on the inner periphery of the second cylinder 15. The female helicoid 15c engages a male helicoid 22a of the front lens group supporting cylinder 22, end the cam grooves 15d engage with the cam pins 24b of the rear lens frame 24. The cam grooves 15d met with the female helicoid 15c at the same position in the circumferential direction of the second cylinder 15 in such a manner that a part of the female helicoid 15c is removed. When assembled, the cam pins 24b of the rear lens frame 24 are engaged with the open grooves 22b of the front lens group supporting cylinder 22, and under this condition, the cam pins 24b are engaged with the cam grooves 15d and the male helicoid 22a is engaged with the female helicoid 15c. Under these conditions, the rotation of the second cylinder 15 causes the front lens group supporting cylinder 22 (front lens group L1) to linearly move in the direction of the optical axis X due to the relationships between the female helicoid 15c and the male helicoid 22a end between the keys 16b of the guide member 16 and the keys 18a of the front lens guide member 18. Further, the rotation of the second cylinder 15 causes the rear lens frame 24 (rear lens group L2) to move along a predetermined locus in the direction of the optical axis X due to the relationships between the cam grooves 15d and the cam pins 24b and between the keys 24a of the rear lens frame 24 and the rear lens group guilding slots 18b of the front lens guide member 18 to thereby effect zooming.

As explained above, when the rotation cylinder 12 is driven the first cylinder 14 linearly moves in the direction of the optical axis X, and when the second cylinder 15 is rotated in relation to the first cylinder 14 the second cylinder 15 moves in the direction of the optical axis X while rotating. As a result, the front lens group L1 and the rear lens group L2 linearly move while the distance between the two lens groups changes to thereby effect zooming.

Figure 3:
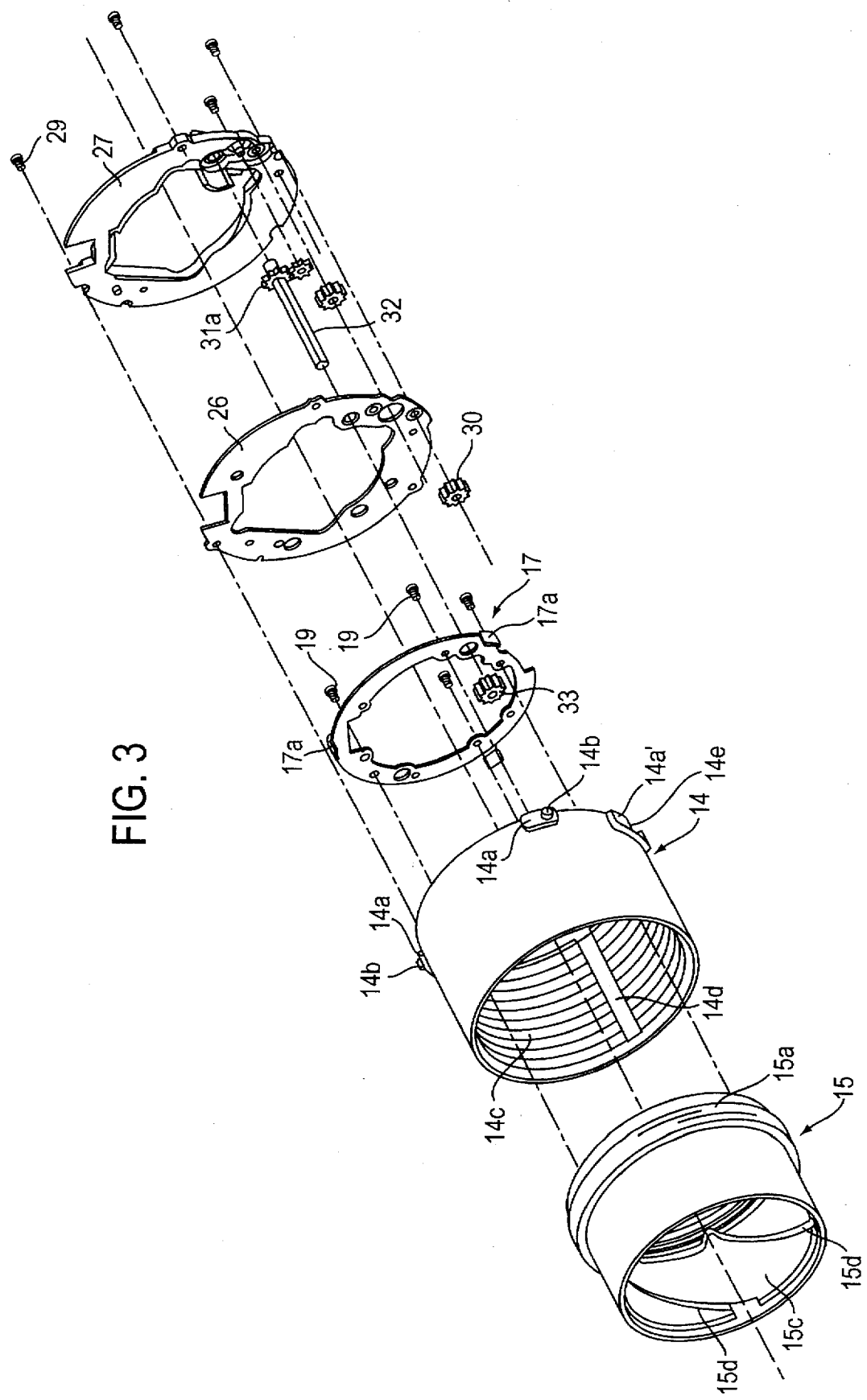
FIG. 3 is an enlarged isometric view of the intermediate portion of the zoom lens barrel shown in FIG. 1.
Figure 5:
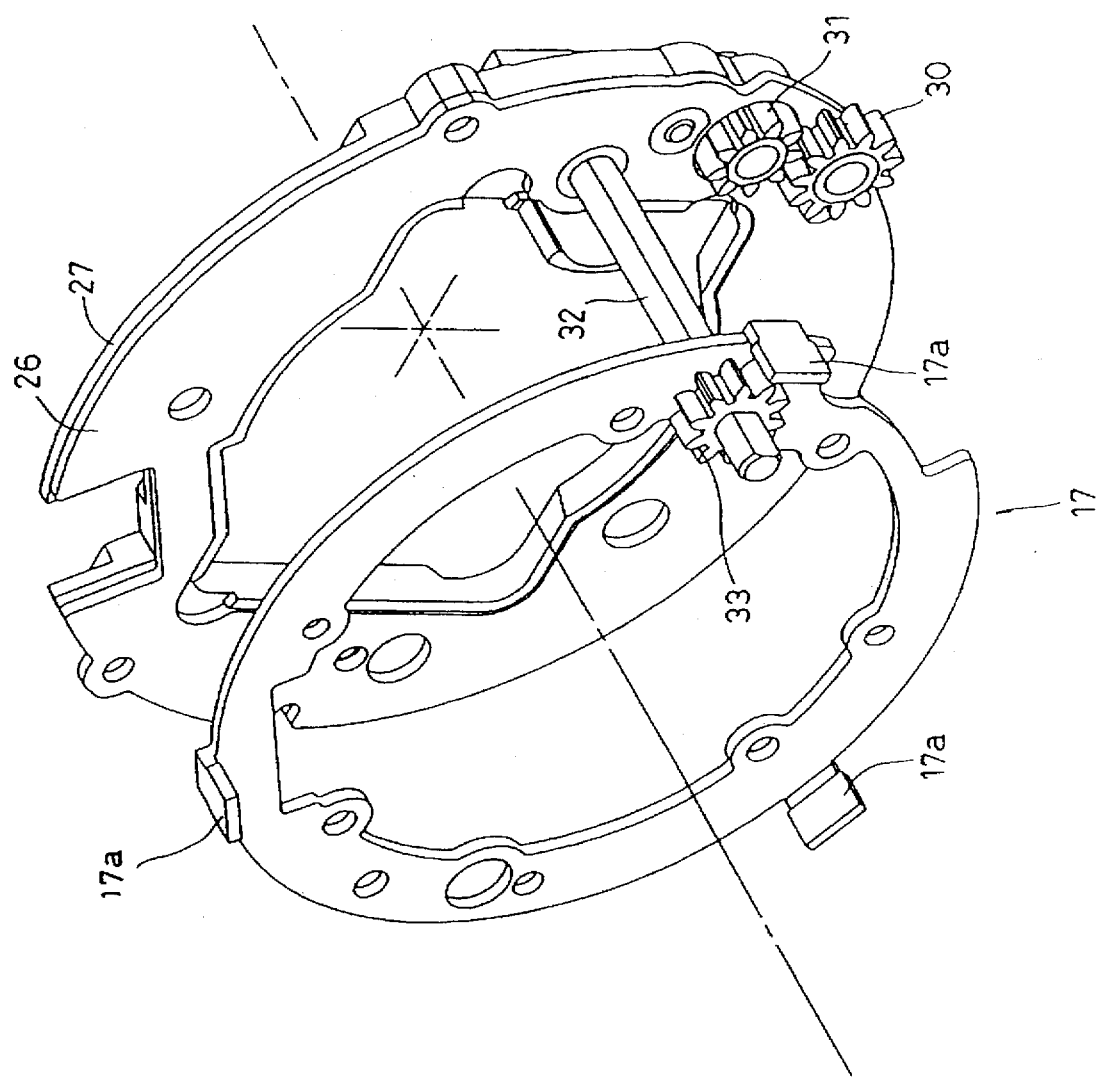
FIG. 5 is a isometric view of a supporting mechanism for a driving system of the zoom lens barrel.
Figure 6:
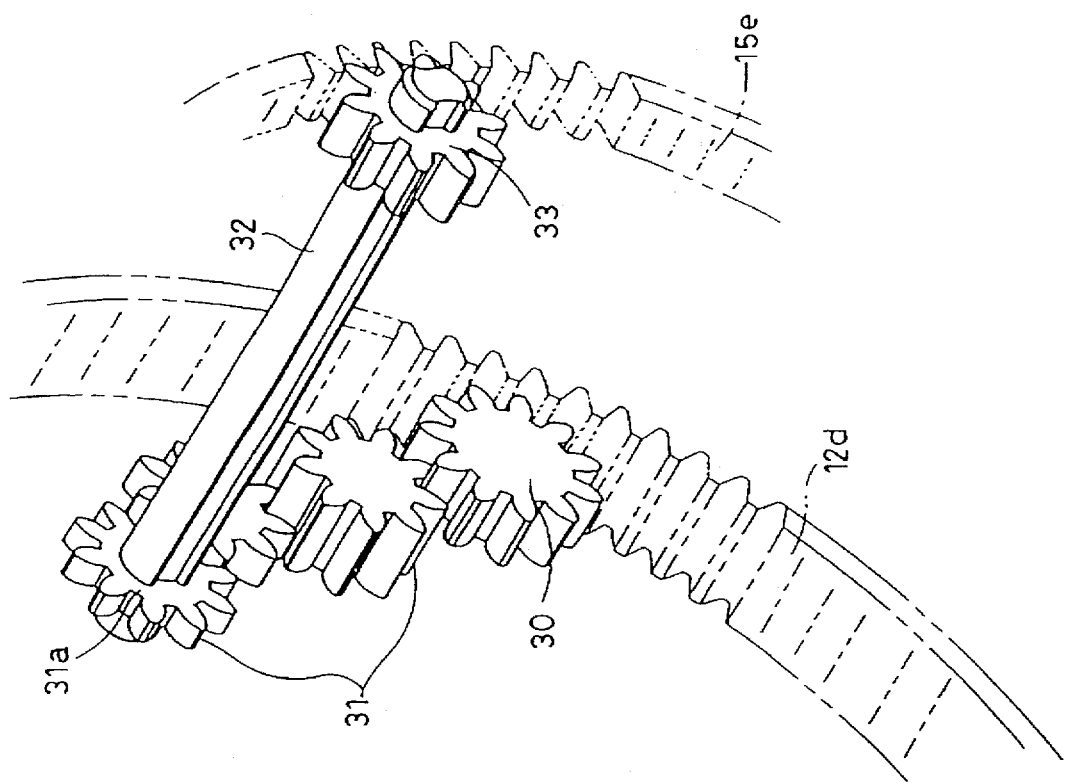
FIG. 6 is a isometric view of gears of the driving system shown in FIG. 5.

Next, a driving mechanism for the second cylinder 15 will he explained. The driving mechanism transmits the rotation of the rotation cylinder 12 to the second cylinder 15. The rear end of the first cylinder 14 is fixed to a pair of gear supporting plates 26 and 27 through fastening screws 29. A pinion 30 engaging the inclined inner gear 12d of the rotation cylinder 12 is rotatably attached to the gear supporting plate 26 as shown in FIGS. 5 and 6. Between two of the three straight keys 14a is formed a straight guide projection 14a' having a space 14e for accommodating a pinion 30 as illustrated in FIG. 3. A part of the teeth of the pinion 30 is accommaodated in the space 14e projects from the outer periphery of the first cylinder 14. The inclined inner gear 12d of the rotation cylinder 12 is parallel to the lead grooves 12c as indicated in FIG. 2, so that the engagement between the pinion 30 and the inclined inner gear 12d is maintained even when the first cylinder 14 moves in the direction of the optical axis X due to the rotation Of the rotation cylinder 12. A gear train 31 receiving the rotation of the pinion 30 is supported between the gear supporting Plates 26 and 27, end a rotation transmitting shaft 32 which forwardly extends along the optical axis is integrally formed with a final gear 31a. The shaft 32 has an constant cross section which is not round.

A pinion 33 is supported on the guide plate 17 fixed to the rear end surface of the guide member 16. The pinion 33 fits on the shaft 32 in a manner such that the pinion 33 is slidable on the shaft 32 in the axial direction thereof but does not rotate with respect to the shaft 32. In other words, the pinion 33 is movable with respect to the shaft 32 in the axial direction thereof and rotatable together with the shaft 32. Thus, the pinion 33 moves along the shaft 32 together with the guide plate 17 (and the second cylinder 15) when the second cylinder 15 moves in the direction of the optical axis X. The pinion 33 meshes with a circumferential inner gear 15e which is formed on the inner surface of the second cylinder 15. Therefore, the rotation of the rotation cylinder 12 is transmitted to the second cylinder 15 through the inclined inner gear 12d, the pinion 30, the gear train 31, the rotation transmitting shaft 32, the pinion 33 and the circumferential inner gear 15e regardless of the position of the first cylinder 14 in the direction of the optical axis X.

In the zoom lens barrel with the above construction according to the present invention, when the rotation cylinder 12 is rotated in a forward or reverse direction by the zoom motor 40, the first cylinder 14 moves in the optical axis direction and the second cylinder 15 rotates. The rotation of the second cylinder 15 allows the second cylinder 15 itself to move in the direction of the optical axis X, and the front lens group L1 and the rear lens group L2 to linearly move while changing the distance between the two lens groups to thereby effect zooming. As described above, the front lens group L1 end the rear lens group L2 are movable between the retracted state of the zoom lens barrel block shown in FIG. 7 and the fully extended position in FIG. 8. Moreover, in the retracted state, the first cylinder 14, the second cylinder 15 and the front lens group supporting cylinder 22 do not project from the outer periphery of the main body (camera body 10), resulting in a very short extension distance.

Next, a mold for forming the above-mentioned rotation cylinder (i. e., cylindrical product) 12 and a method of manufacturing the mold characteristics for the present invention will be explained with reference to FIGS. 9 to 15. The rotation cylinder 12 shown in FIG. 9 is manufactured by using a mold 35 illustrated in FIG. 10. The mold 35 is provided with an upper mold 40 forming the upper surface of the rotation cylinder 12 and a lower mold 41 for forming the inner surface of the cylinder 12. The lower mold 41 includes a first cylindrical mold 36 with spiral teeth 36a for the inclined inner gear 12d of the rotation cylinder 12, and a second cylindrical mold 37 with a spiral flat portion 37a for the relief groove 12e. The second cylindrical mold 37 is further provided with three spiral projections 37b corresponding to the lend grooves 12c.

Figure 15:
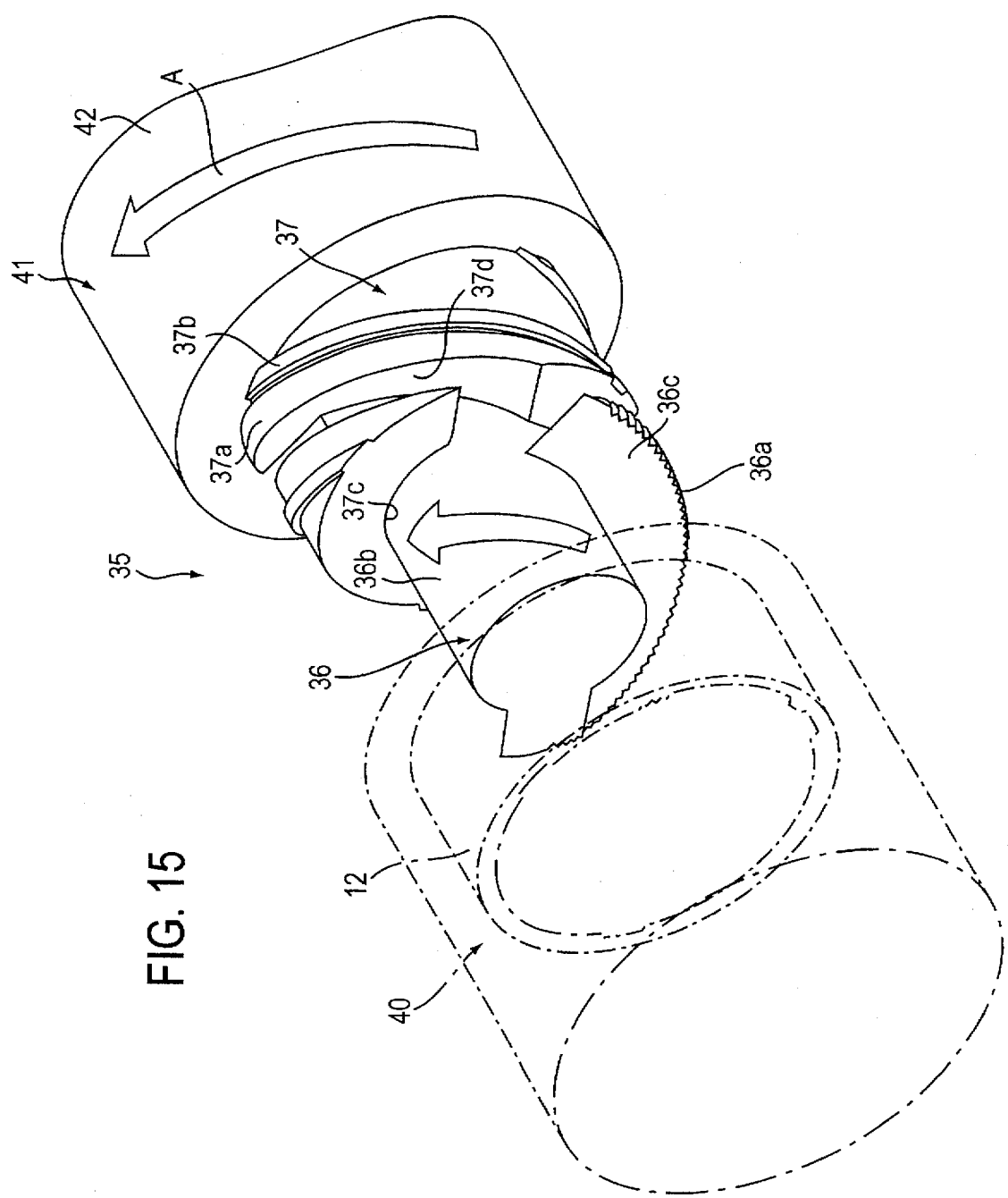

The first cylindrical mold 36 is provided with a small cylindrical portion 36b which is smaller than the second cylindrical mold 37 in diameter, and a spiral portion 36c with a larger diameter than that of the small cylindrical portion 36b (see FIG. 15). The above-mentioned teeth 36a are formed on the outer periphery of the spiral portion 36c. The second cylindrical mold 37 is provided with an engagement hole 37c at the center thereof, and the first cylindrical mold 36 is slidably engaged with the hole 37c. The second cylindrical mold 37 is provided with an engagement groove 37d between the projections 37b of the flat portion 37a as illustrated in FIG. 15. The groove is formed to have a spiral in the same direction as the spiral portion 36c. When the second cylindrical mold 37 is rotated in the direction indicated by the arrow A in FIG. 10 under the condition that the spiral portion 36c is engaged with the groove 37d, the second cylinder mold 37 is separated from the rotation cylinder 12 in such a manner that the spiral portion 36c (teeth 36a) is gradually moved apart from the engagement groove 37d and the teeth 36a meshing the inclined inner gear 12d are left in the rotation cylinder as it is. The upper mold 40 is divided into two pieces (not shown) at an appropriate position, for instance, to remove the rotation cylinder as a product out of the mold.

Figure 11:
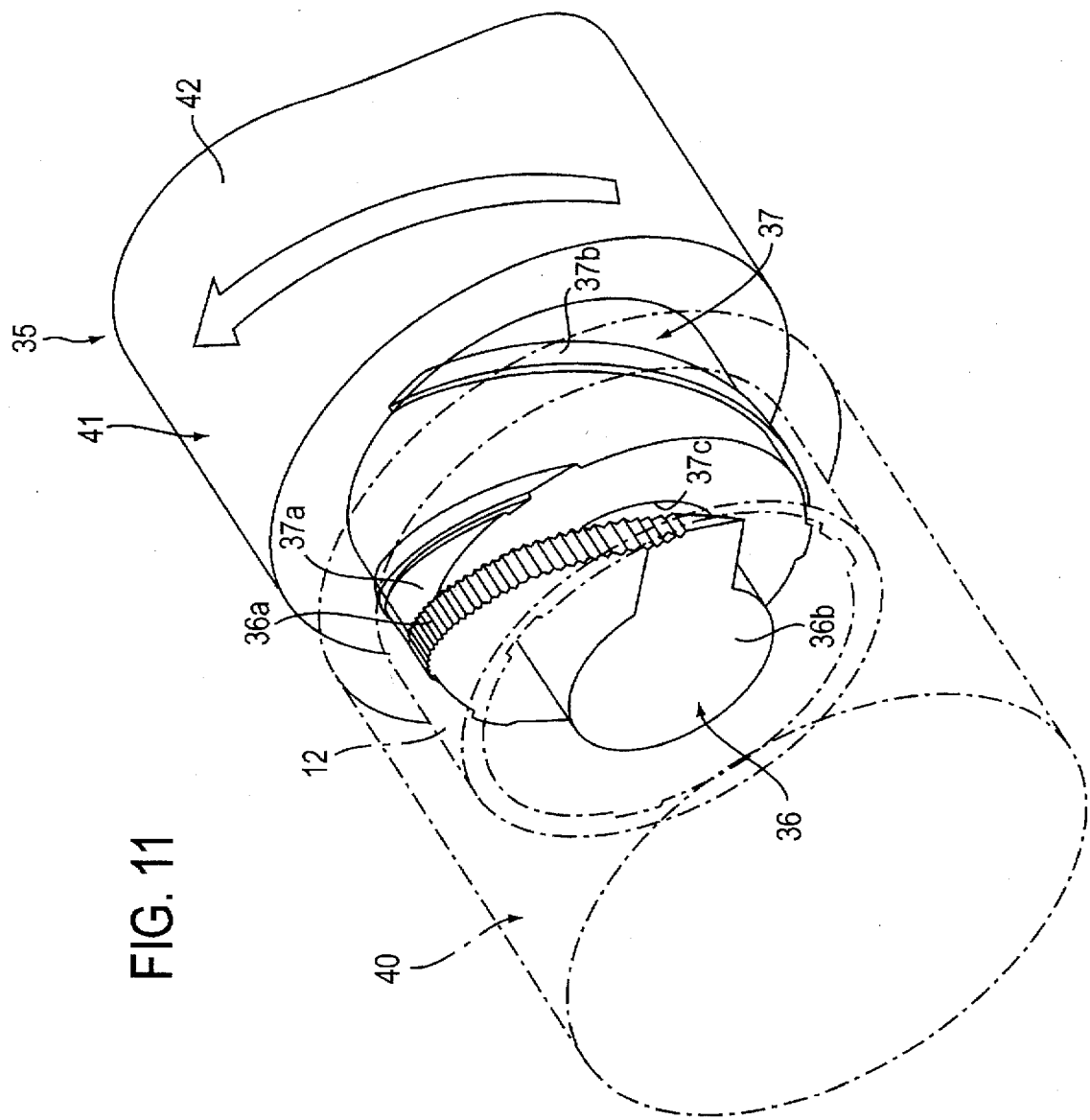
Figure 12:
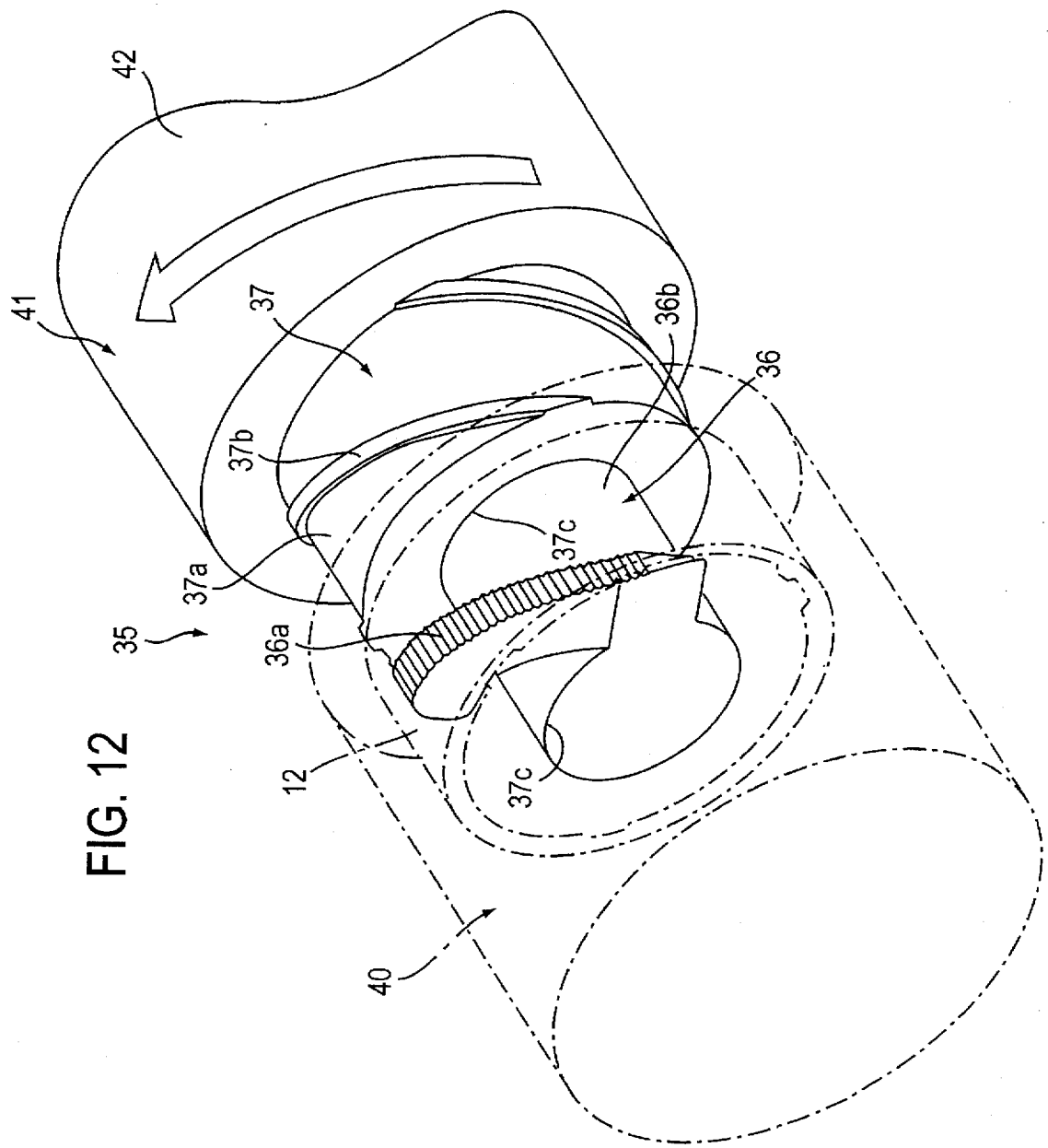

Next, the process for manufacturing the rotation cylinder 12 by using the mold 35 with the aforementioned construction will he explained. At first, the upper mold 40, the first cylindrical mold 36 and the second cylindrical mold 37 are combined in a predetermined stare to provide a space for forming the rotation cylinder 12. Under this condition, synthetic resin material is poured into the space, and after the synthetic resin material has hardened, the second cylindrical mold 37 is rotated in the direction indicated by the arrow A in FIG. 10 to gradually separate the mold from the upper mold 40 as illustrated in FIGS. 11 and 12. In this case, the second cylindrical mold 37 causes the small cylindrical portion 36b to become separated from the engagement hole 37c thereof while rotating, and is separated from the rotation cylinder 12 while the teeth 36a meshing with the inclined inner gear 12d are left as is in the rotation cylinder 12.

Figure 13:
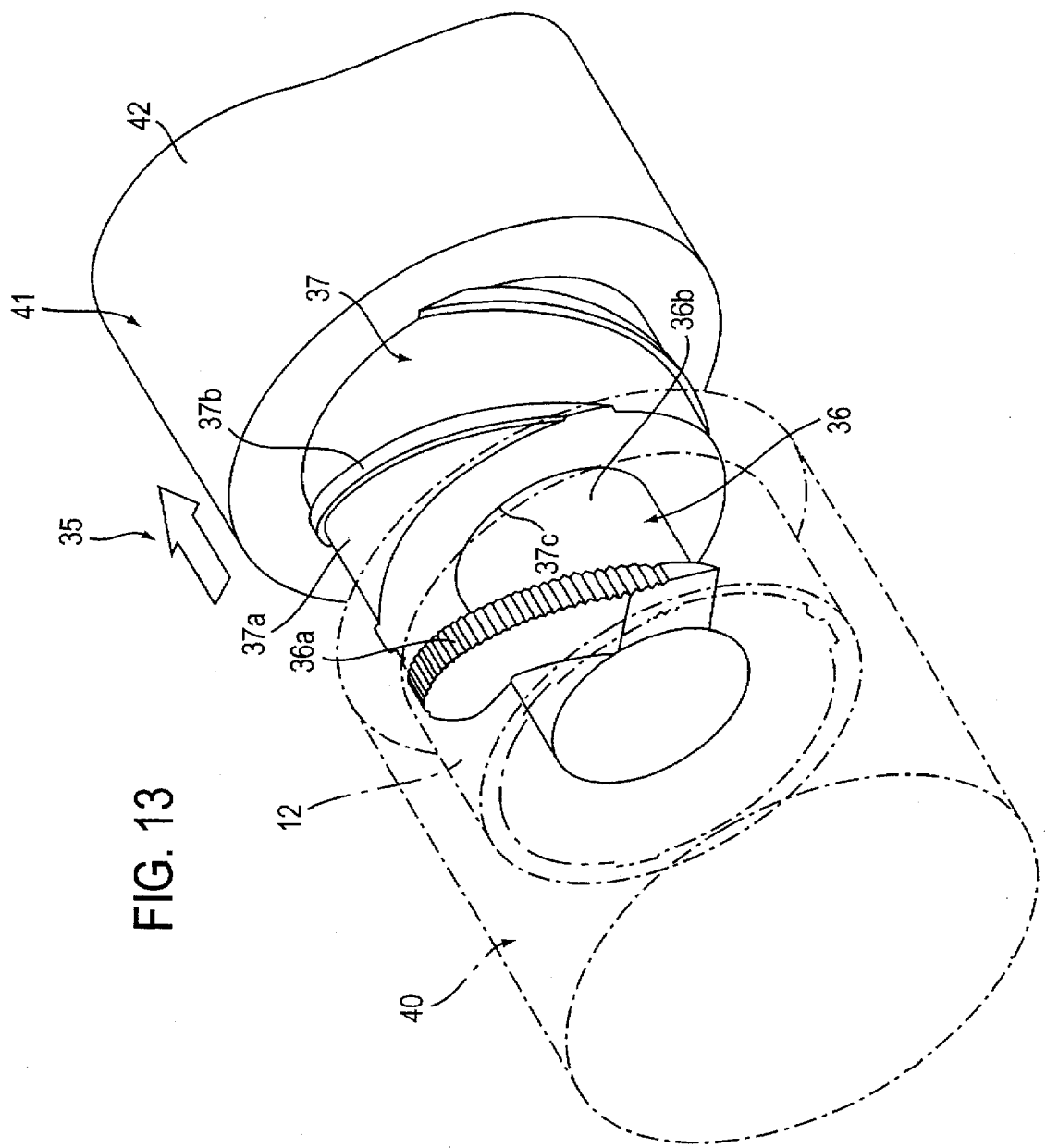
Figure 14:
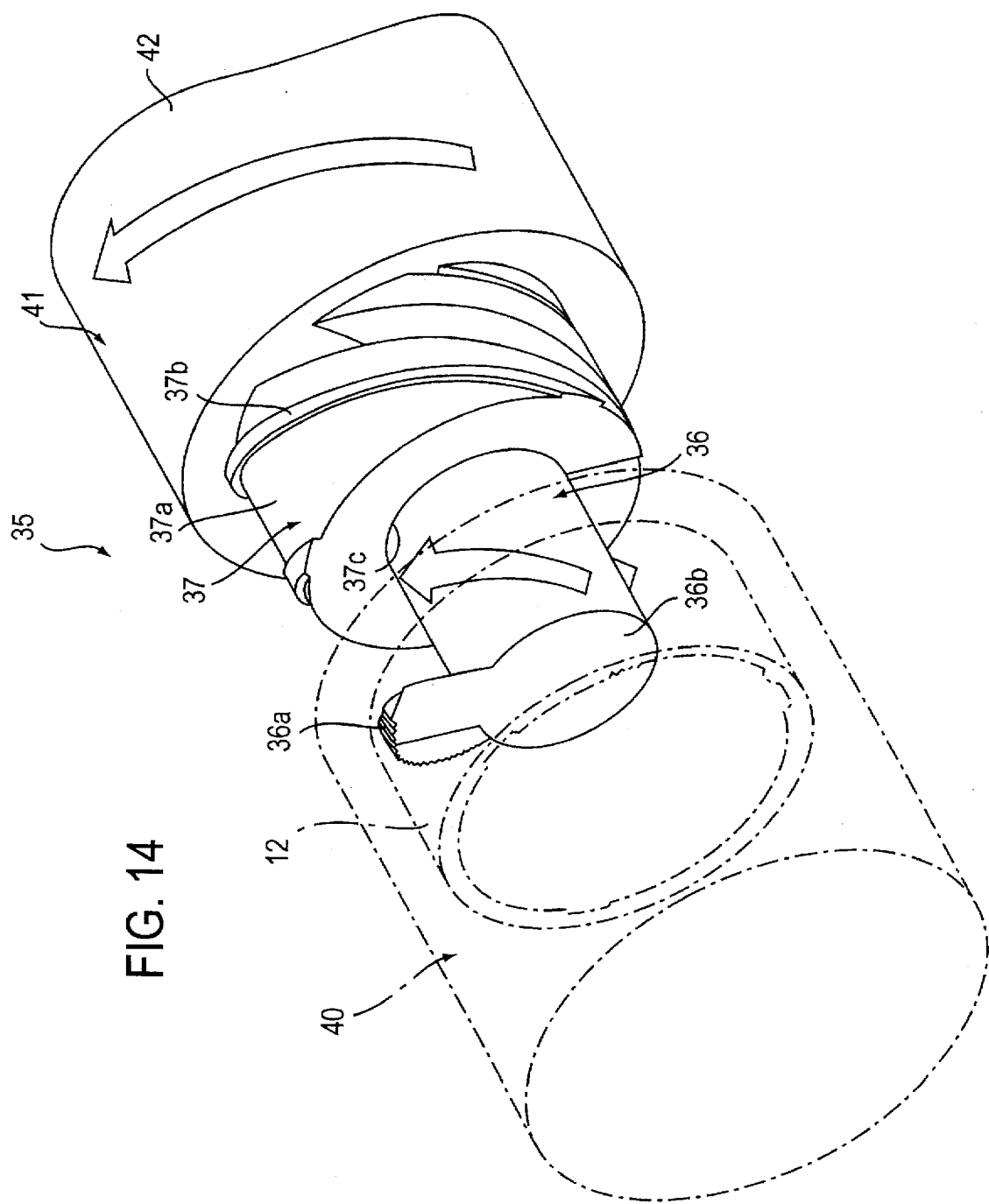

After that, as illustrated in FIG. 13, the first cylindrical mold 36 is moved in a direction that it is away from the upper mold 40, and the teeth 36a become separated from the inclined inner gear 12d so as to be situated on the relief groove 12e. In this situation, the first cylindrical mold 36 is rotated in the direction that the second cylindrical mold 37 rotates, thereby the spiral portion 36c with the teeth 36a are separated from the rotation cylinder 12 from the inside thereof along the spiral of the relief groove 12e. With the above-mentioned procedures, the rotation cylinder 12 as a product is left in the upper mold 40, but it is possible to extract the cylinder 12 if the upper mold 40 is divided into appropriate pieces.

As described above, according to the above-mentioned embodiment of the present invention, it is possible to provide a cylindrical product in which an inner gear is not formed on overall inner surface thereof and other cam grooves are formed thereon. The cylindrical product is provided with a relief groove thereon so that this relief groove is effectively used to separate the mold from the inner gear after the formation of the inner gear.

The above-mentioned mold for the cylindrical product according to the above-mentioned embodiment of the present invention includes an upper mold for forming the outer surface of the cylindrical product and a lower mold for forming the inner surface of the cylindrical product thereof, and the lower mold includes the first cylindrical mold with a spiral toothed portion for the inner gear and the second cylindrical mold with a spiral flat portion for the relief groove. As a result, a cylindrical product with a spiral inner gear inclined to the circumferential direction thereof and a relief groove adjacent to the inner gear can be formed with ease.

Further, the mold for a cylindrical product with a spiral lead groove parallel to an inner gear includes an upper mold for forming the outer surface of the cylindrical product and an inner mold for forming the inner surface thereof, and the lower mold includes the first cylindrical mold with a spiral toothed portion for the inner gear and the second cylindrical mold with a spiral flat portion for the relief groove, and further the second cylindrical mold includes a spiral projection for the lead groove, so that the cylindrical product with the spiral inner gear is inclined to the circumferential direction thereof, and the relief groove adjacent to the inner gear, and the spiral lead groove parallel to the inner gear can he formed with ease.

Still further, the method for manufacturing a cylindrical product according the above-mentioned embodiment of the present invention includes the steps of: combining the first cylindrical mold with a spiral toothed portion for an inner gear, the second cylindrical mold with a spiral flat portion for a relief groove, and a lower mold for forming the inner surface of the cylindrical product pouring resin material into the space formed by the upper and lower molds; rotating the second cylindrical mold to separate from the upper mold, after the resin material in the space has hardened; axially moving the first cylindrical mold to separate the toothed portion from the upper mold; and rotating the first cylindrical mold to separate it from the upper mold, so that the cylindrical product with the spiral inner gear, inclined to the circumferential direction thereof and the relief groove adjacent to the inner gear can be manufactured with ease.

Next, a mold for a cylindrical form product according to another embodiment of the present invention will be explained with reference to the drawings. The metal mold of an injection molding machine is formed by slide cores which are obtained by dividing the metal mold into a plurality of pieces, and each of the slide cores are radially moved to open and close the mold. In the embodiment shown in FIGS. 16 through 29, the inner gear manufactured through injection molding according to the present invention is applied to an inner toothed portion 113 of a cam ring 111 in cameras. However, it is needless to say that the present invention is applicable to the same rotation cylinder as the previous embodiment. At first, the construction of the cam ring 111 and the outline of the metal mold for manufacturing the cam ring 111 through injection molding will be explained.

Figure 16:
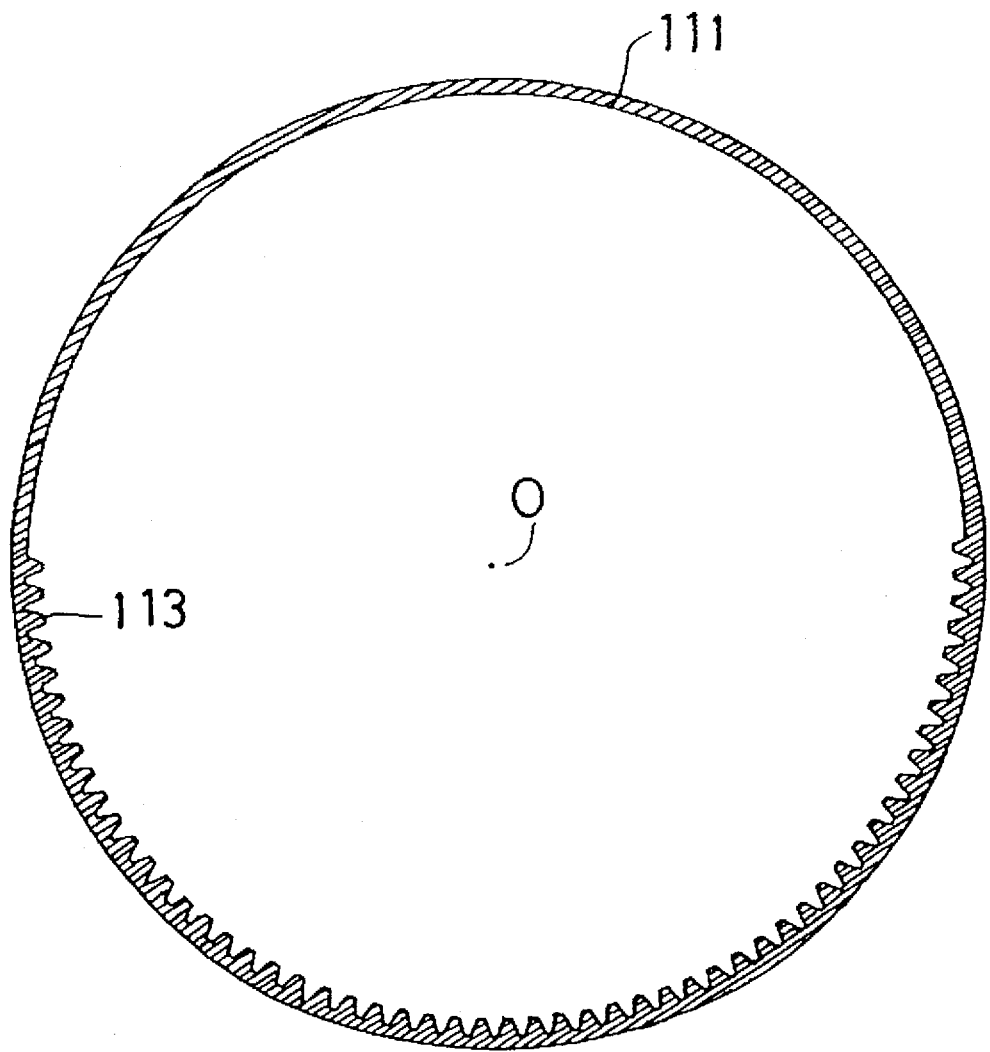
FIG. 16 is a front view of a cam ring with an inner gear according to an embodiment of the present invention.
Figure 20:
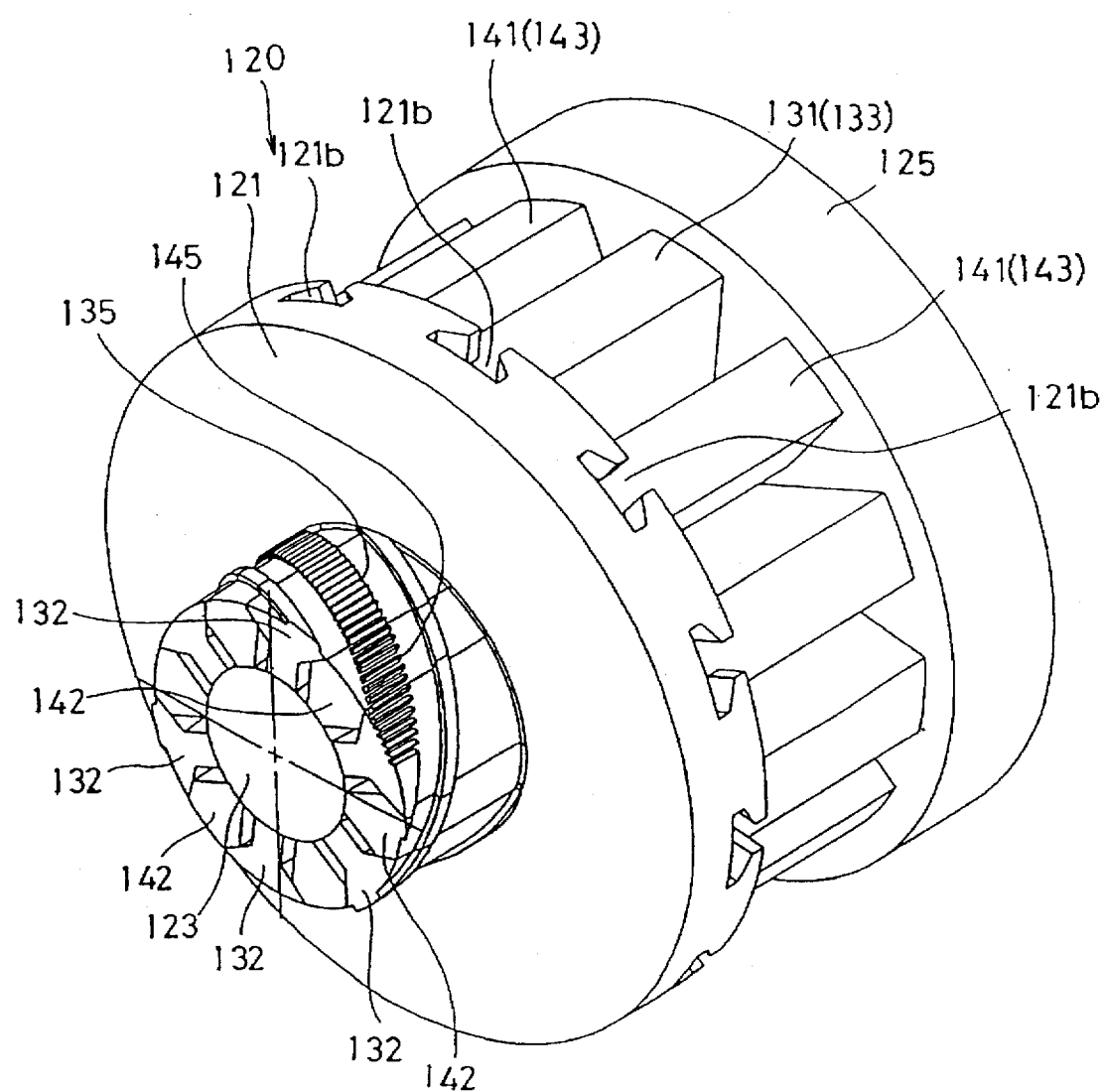
FIG. 20 is a isometric view of the first and second inner slide cores according to the embodiment in a closed state.
Figure 21:
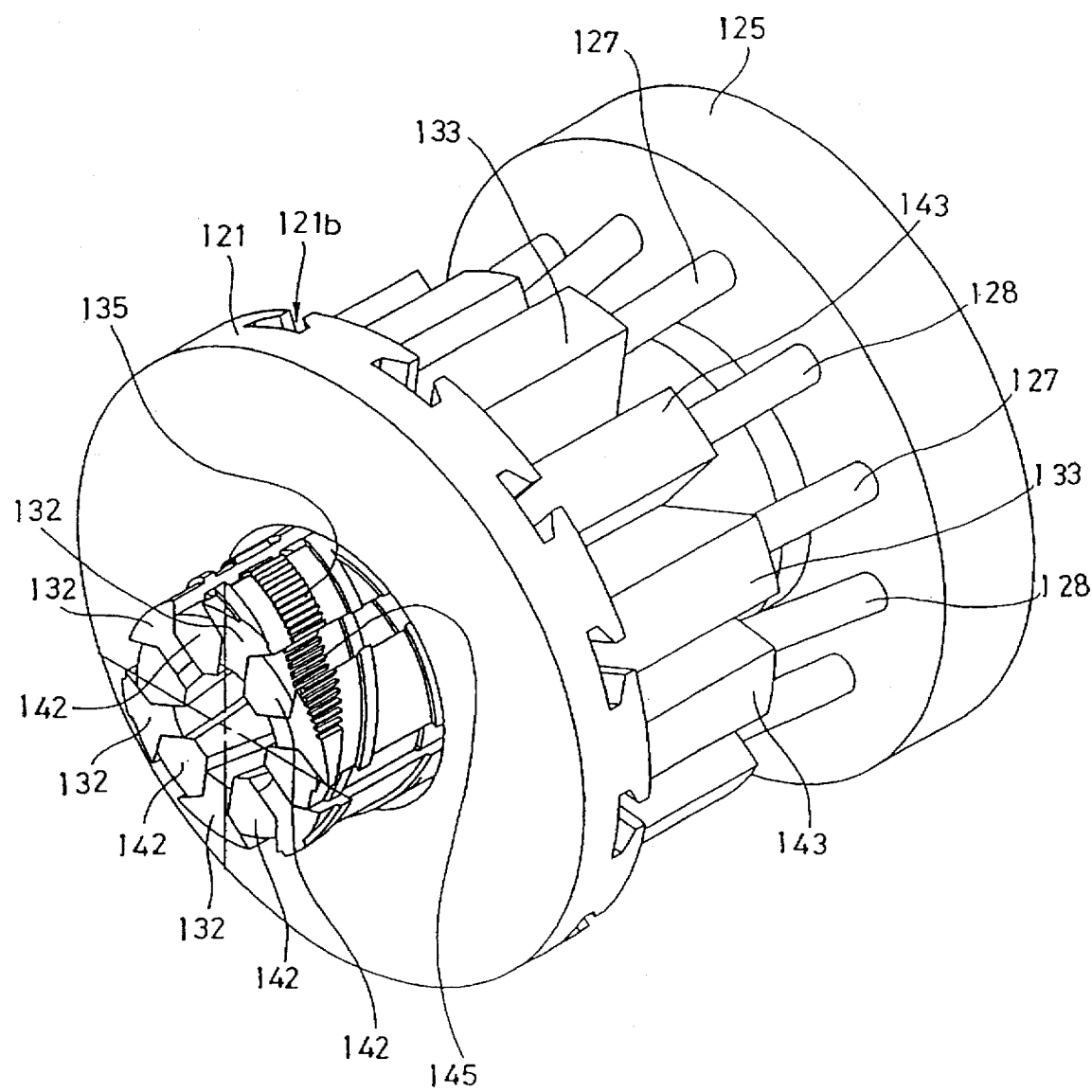
FIG. 21 is a isometric view of the first and second inner slide cores according to the embodiment in an open state.
Figure 22:
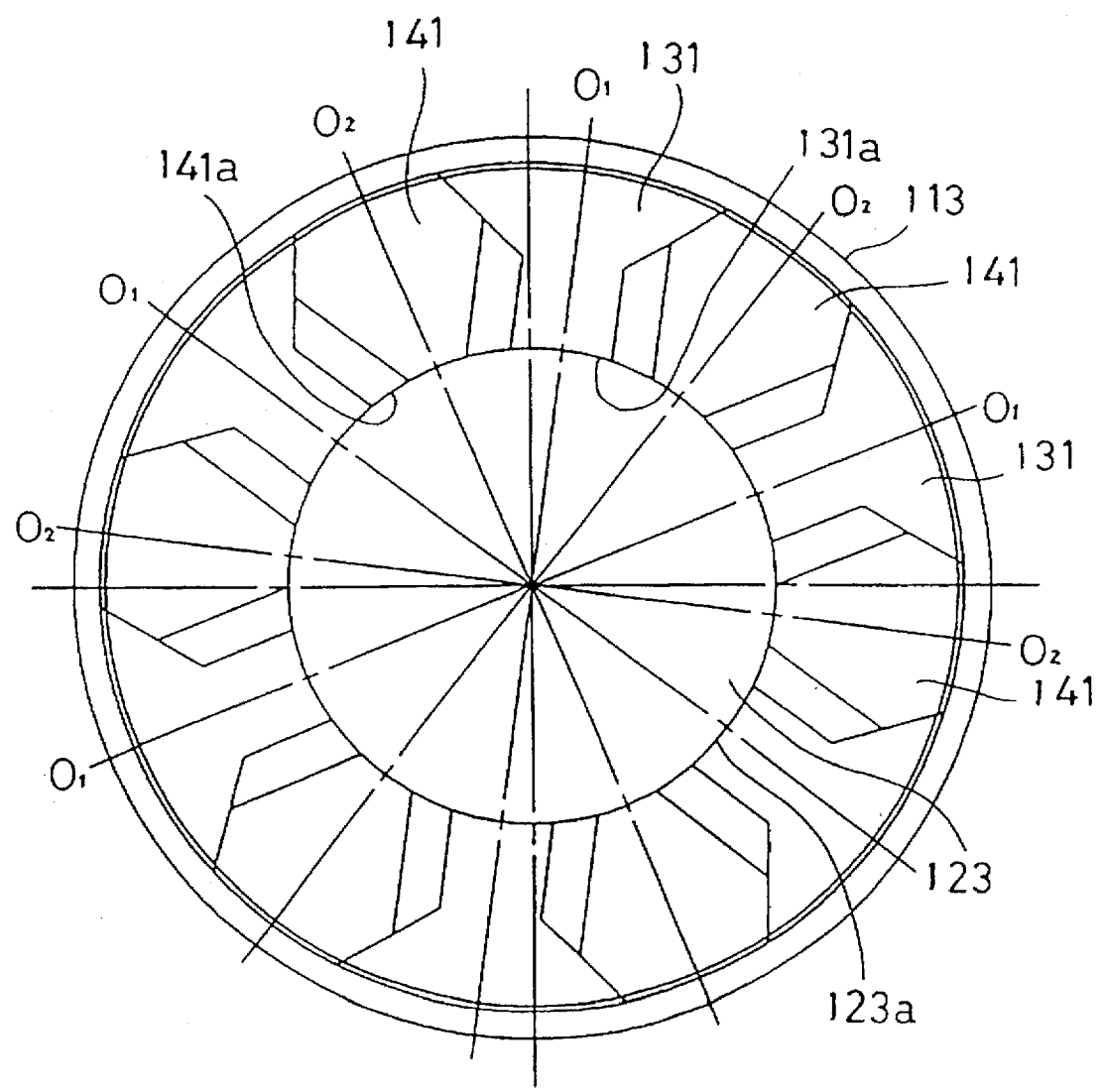
FIG. 22 is a front view of the first and second inner slide cores according to the embodiment in a closed state.

As illustrated in FIG. 16, which is a front view of the cam ring 111 the cam ring 111 is provided with inner teeth 113 on the inner surface thereof. The inner surface of the cam ring 111 including the inner teeth 113 is formed by a plurality of sets of inner molds 132, 142 constituting a divided inner mold as shown in FIGS. 20 to 23. Each of the inner mold portions 132, 142 radially move at different velocities about the center line O of the mold, which coincide with the center line of the rotation of the cam ring 111 to open and close the inner mold. FIGS. 20 and 22 show the inner mold in a closed state and FIGS. 21 and 23 indicate the mold in a open state.

The inner teeth 113 of the cam ring 111 extend parallel to the center line of the cam ring 111, and end faces of the inner teeth 113 continue in the shape of a spiral. The inner teeth are formed by substantially one half of the inner periphery of the cam ring 111. In this embodiment, parting lines of inner molds 132, 142 are formed at the roots of the outer teeth (tooth product) 135, 145 for forming the inner gear 113. The parting lines this embodiment pass through corners 135a, 145a where the inner molds 132, 142 contact each other when closed.

In this embodiment, the following formula is satisfied:

$$Z=(S/2)-n \quad (2)$$

where, Z designates the number of teeth per one revolution of the inner gear 113; S designates the total number of inner molds 132, 142; and n designates a positive integer which is selected from even numbers in consideration of gears meshing with inner gears 113, as discussed below.

As describe above, when the number Z of inner teeth 113 and the total number of the inner molds 132, 142 are set to satisfy the above formula, the parting lines of the inner molds 132, 142 can be formed on the roots of the outer teeth 135, 145. In this embodiment, S and n are set to be 12 and 18, respectively, so that Z becomes 108. In the embodiment if n were less than 14, the shape of the gear would not be an involute. If n were greater then 18, the inner molds 132, 142 would be too small. Therefore n is selected depending upon the particular design considerations.

The cam ring 111 according to this embodiment is provided with the inner teeth 113 not all over the inner periphery thereof but on about one half of the inner periphery. Therefore, it is needless to say that the inner molds 132, 142 are not always provided with the outer teeth 135, 145 but only inner molds at the required portions are provided with the outer teeth.

Figure 17:
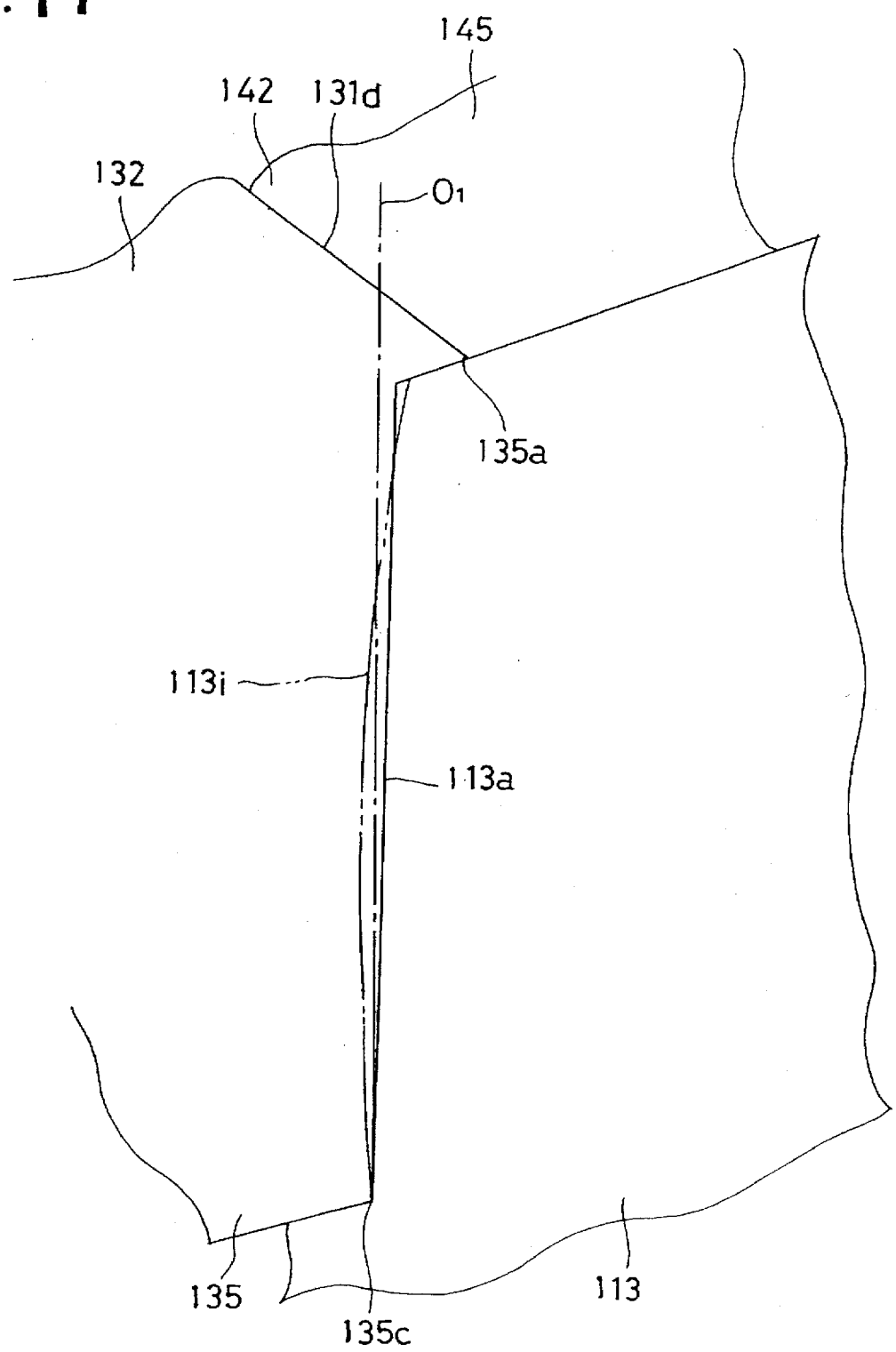
FIG. 17 is an enlarged front view of a primary portion of the cam ring and inner molds according to an embodiment to which an inner gear of the present invention is applied.

The characteristics of the inner gear according to the present invention will be explained in detail with reference to FIG. 17. FIG. 17 is an enlarged front view of a tooth form and the portion adjacent to the contact portion (parting line) of the inner molds 132 and 142 for forming the tooth. This figure indicates the state that the inner molds 132 and 142 are closed, that is, the condition where one tooth of the inner teeth 113 is formed in the space which is enclosed by the outer teeth 135 of the mold 132 and the outer teeth 145 of the mold 142. Reference symbol 113$i$ is a part of an ordinary involute tooth form.

The inner mold 132 linearly moves in the direction parallel to a slide line $O_1$ when the mold is open and closed, which causes the corner 135$e$ of the addendum of the outer teeth 135 to move on the slide line $O_1$ which passes the corner 135$c$. The slide line $O_1$ overlaps the involute tooth form 113$i$, that is, the corner 135$c$ is interfered with by thru involute tooth form 113$i$.

Therefore, in this embodiment, when the tooth form 113$a$ for the inner teeth 113 is formed in such a manner that the outer teeth 135 are not interfered with by the tooth form 113$a$ when the inner molds 132 and 142 are radially moved while they are open or closed. In other words, in FIG. 17, the tooth 113$a$ is formed so as not to contact the slide line $O_1$ nor intersect the line $O_1$. The shape of the tooth form is freely selected if the above-mentioned condition is satisfied. In this embodiment, however, the shape of the tooth form 113$a$ is based on the involute tooth shape 113$i$ and lines resembling the tooth shape are adopted so as not to loose the smooth rotation of the inner gear 113 when meshing with other gears. Cycloid teeth may be adopted as a standard tooth shape.

The condition that the locus of the teeth 135 and 145 do not contact or intersect with the inner gear 113 must be satisfied for all of the teeth 134 and 145. In this embodiment, however, if this condition is satisfied for the teeth 135 at an end of the inner mold 132, other teeth 135, 145 always satisfy the condition since the circumferential length of the inner mold 132 is longer than that of the inner mold 142.

The first and second slide cores 131, 141 of each set according to this embodiment basically have the same shape as those of other sets, but the outer peripheral surfaces of the inner molds 132, 142 are shaped in accordance with the inside of the final molded product.

Figure 23:
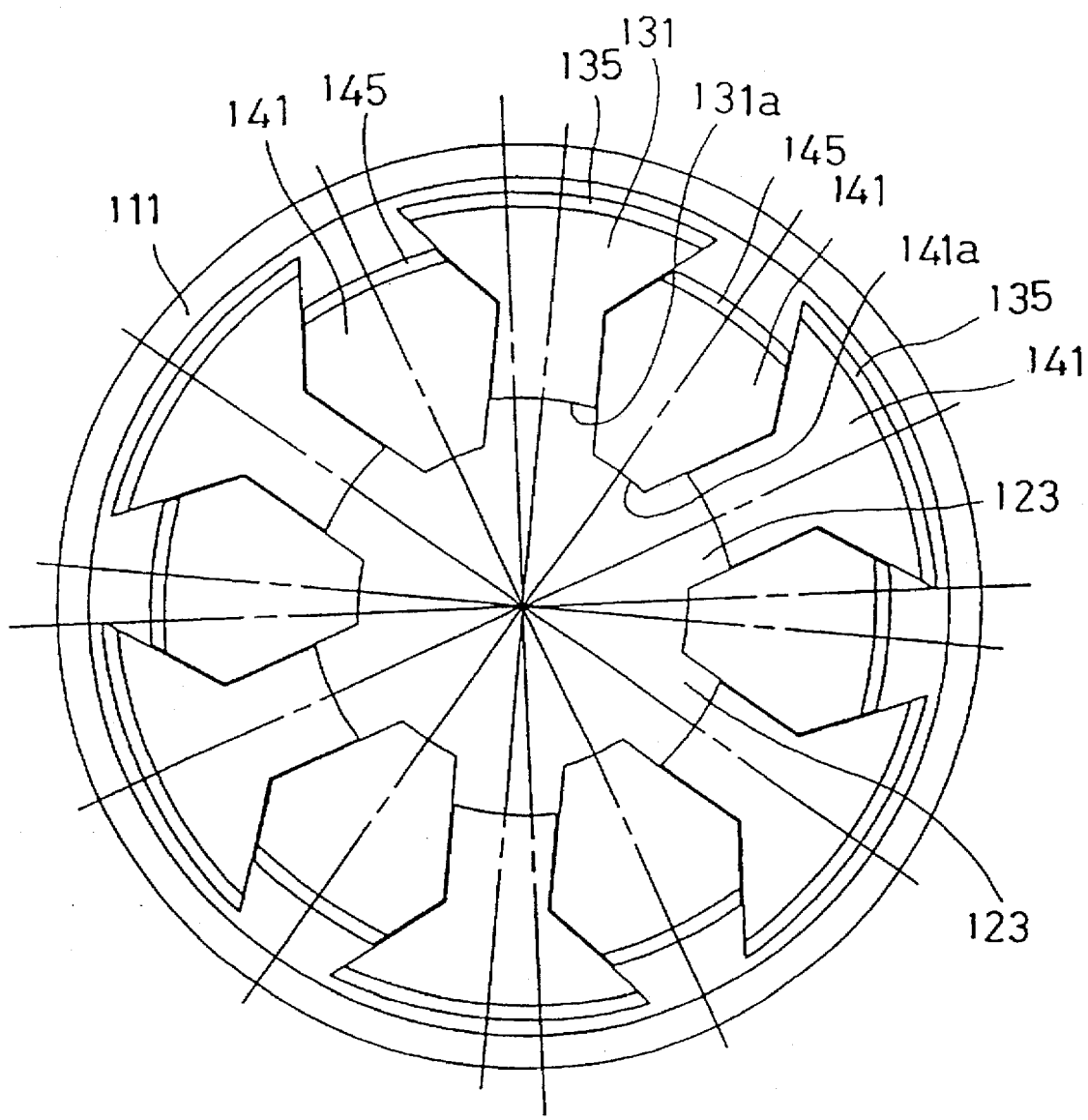
FIG. 23 is a front view of the first and second inner slide cores according to the embodiment in an open state.

The outline of the mold of injection molding machine for the cam ring 111 with the inner teeth 113 will be further explained with reference to FIGS. 20 to 23. FIGS. 20 and 21 are isometric views of a primary portion of the inner slide cores (inner molds 132, 142) according to an embodiment of the metal mold of an injection molding machine for the cam ring 111 in closed state and open state respectively, and FIGS. 22 and 23 are front views of the primary portion in those states.

The metal mold 120 includes a plurality of sets of inner slide cores 131 and 141 (6 sets, a total of 12 pieces in this embodiment) for forming the inner peripheral surface of the cam ring 111, in which one set of slide cores consists of a first inner slide core 131 and a second inner slide core 141; a plate 121 for movably supporting the inner slide cores 131 and 141 in the radial direction vertical to the center line O of the metal mold which coincides with the center line of the cam ring 111; a lock core 123 situated in a space near the center line which is enclosed by the inner peripheral surfaces 131a and 141a of the first and second inner slide cores 131 and 141 for pressing and supporting the first and second inner slide cores 131, 141 in a closed state when the lock core proceeds to a front position through the movement parallel to the center line O; a plate 125 for moving the lock core 123; and angular pins 127, 128 secured to the plate 125 for driving the first and second slide cores 131, 141 at different velocities in the direction that the cores are open and closed while the plate 125 moves. The fixed plate 121 is secured to a block or the like of the injection molding device, and the movable plate 125 is driven by a hydraulic cylinder, a pressing shaft or the like which are not illustrated in drawings in detail.

Each of the first and second slide inner cores 131, 141 is provided with inner mold 132, 142 respectively which is integrally formed with the front ends of the base portions 133, 143, and the inner molds 132, 142 closely contact with other neighboring inner molds 132, 142 in the closed state to form the inner peripheral surface of the cam ring 111. Further, the base portions 133, 143 are provided with guide portions 134, 144 to guide the first and second inner slide cores 131, 141 (inner molds 132, 142) in the direction that the cores are open and closed (radial direction). The first and second inner slide cores 131, 141 of each set are the same in their basic construction, other structure relating to the basic construction, and mechanism, therefore will be explained hereinafter in relation to one set of the first and second inner slide cores.

The guide portions 134, 144 are provided with dove-tail cross-sections (which are not indicated in the drawings in detail). A dove-tail guide groove 121b is formed on the fixing plate 121, which extends in the direction perpendicular to the center line O (center line of the cam ring 111), and the guide portions 134, 144 are slidably engaged with the guide grooves 121b. Each of the inner molds 132, 142 forwardly projects from an opening 121a of the fixing plate 121 in the above-mentioned engagement state and radially moves while guided by the guide portions 134, 144 and the guide groove 121b.

The inner molds 132, 142 are separated from each other so as to be open when moving toward the center line O. Further, the inner molds 132, 142 radially move so as to be apart from the center line O to abut an edge 121c of the opening 121a at the outer peripheral surface thereof, then the moment that further outward movement is restricted, the inner molds 132, 142 are in closed state. The position and state of the inner molds 132, 142 at this moment is referred to as closed position and closed state.

Outer gears 135, 145 for forming inner teeth 113 in the closed state are formed on the outer peripheral surface of each of the inner molds 132, 142. The cam ring 111 may be provided with the inner teeth 113 as well as grooves, holes, projections and protrusions. In such a case, protrusions, projections, holes and grooves are formed on the inner molds 132, 142.

End faces of the cam ring 111 are formed by front faces of the fixing plates 121, the inner diameter of the opening 121a is almost the same as that of the cam ring 111, and the inner peripheral surface of the cam ring 111 is formed by the inner molds 132, 142 projecting from the opening 121a.

The inner peripheral surfaces 131a, 141a of the first and second inner slide cores 131, 141 are formed so as to gradually become smaller in diameter toward the fixed total mold 151 (in a forward direction) in a truncated shape, and the lock core 123 is formed like a truncated cone in which the tapered portion 123a thereof contacts the inner peripheral surfaces 131a and 141a. The angle between the tapered portion 123a or inner peripheral portions 131a, 141a and the center line O is defined as $\theta_G$.

The movable plate 125 is provided with angular pins 127, 128 for transmitting linear movement in the forward and rearward directions parallel to the center line O thereof, to the inner slide cores 131, 141 as they move in the direction to open and close. The front shaft portions 127a, 128a of the pins 127, 128 are slidably accommodated in guide holes 136, 146 of the inner slide cores 131 and 141 respectively.

The angular pins 127, 128 are secured to the movable plate 125 at prescribed angles $\theta_D$, $\theta_E$ with the center line O to move the first and second inner slide cores 131, 141 at different velocities. The movable plate 125 is provided with counterbored screw holes 125a, 125b positioned so that extrapolations of their axes intersect the center line O at angles $\theta_D$, $\theta_E$ respectively. Male thread portions 127c, 128c are formed on the angular pins 127, 128 at portions adjacent to the heads 127b, 128b thereof. In this construction, the front shaft portions 127a, 128a of the angular pins 127, 128 are inserted into the screw holes 125a, 125b from the rear of the movable plate 125, and the male thread portions 127c, 128c are engaged with the screw holes 125a, 125b, which permits the angular pins 127, 128 to be secured to the movable plate 125 at angles $\theta_D$, $\theta_E$ with respect to the center line O.

The angles $\theta_D$ and $\theta_E$ are different from each other to allow the first and second inner slide cores 131 and 141 to be driven at different velocities. In this embodiment, the second inner slide core 141 contacts the first inner slide core 131 from the side of the center line O, so that the above-mentioned angles are set to be $\theta_D < \theta_E$ to move the second inner slide core 141 faster than the first inner slide core 131 when the filed plate 125 moves back and forth, The velocities of the first and second inner slide cores 131, 141 relative to the lock core 123 in the direction that the they are open and closed (radial direction) are $\tan \theta_D$ and $\tan \theta_E$ respectivel.

Means for driving the first and second inner slide cores 131, 141 at different velocities is not limited to the angular pins 127, 128, but other constructions may be adopted, for instance, an inclined surface on the lock core 123 may slidably contact an inclined surface on the inner surface of the slide cores 131, 141, or a groove on a member and a protrusion on the other memher may slidably engage with each other.

Further in this embodiment, the inclined angle $\theta_G$ of the tapered portion 123a is set to be $\theta_D \leq \theta_E \leq \theta_G$ to cause the tapered portion 123a of the lock core 123 to abut the inner peripheral surfaces 131a, 141a at the closed position or a nearly closed position and not to be interfered with at other retracted positions therefrom.

Figure 18:
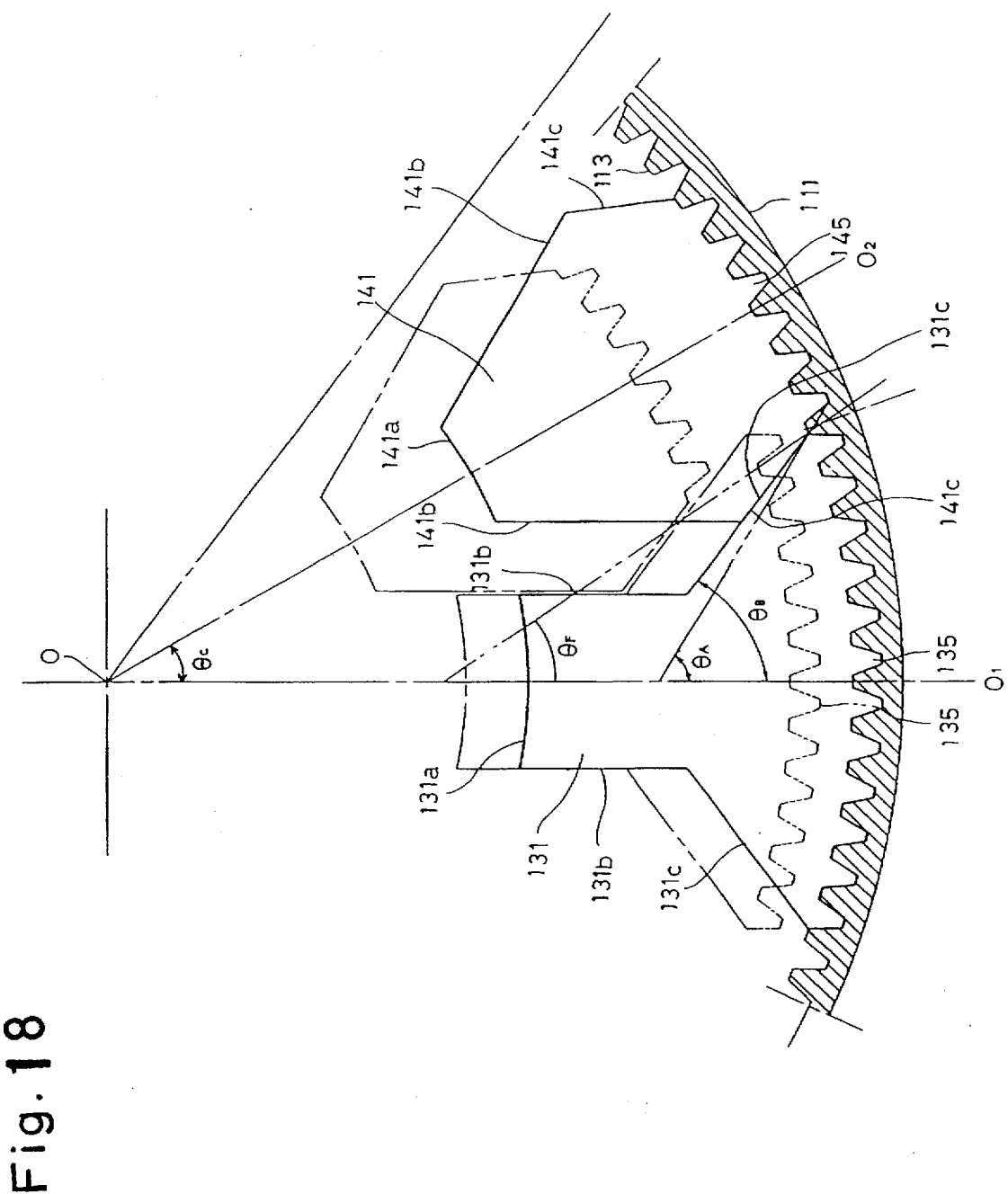
FIG. 18 is a front view of a mold of an injection molding device with a plurality of pairs of first and second inner slide cores according to an embodiment of the present invention.
Figure 19:
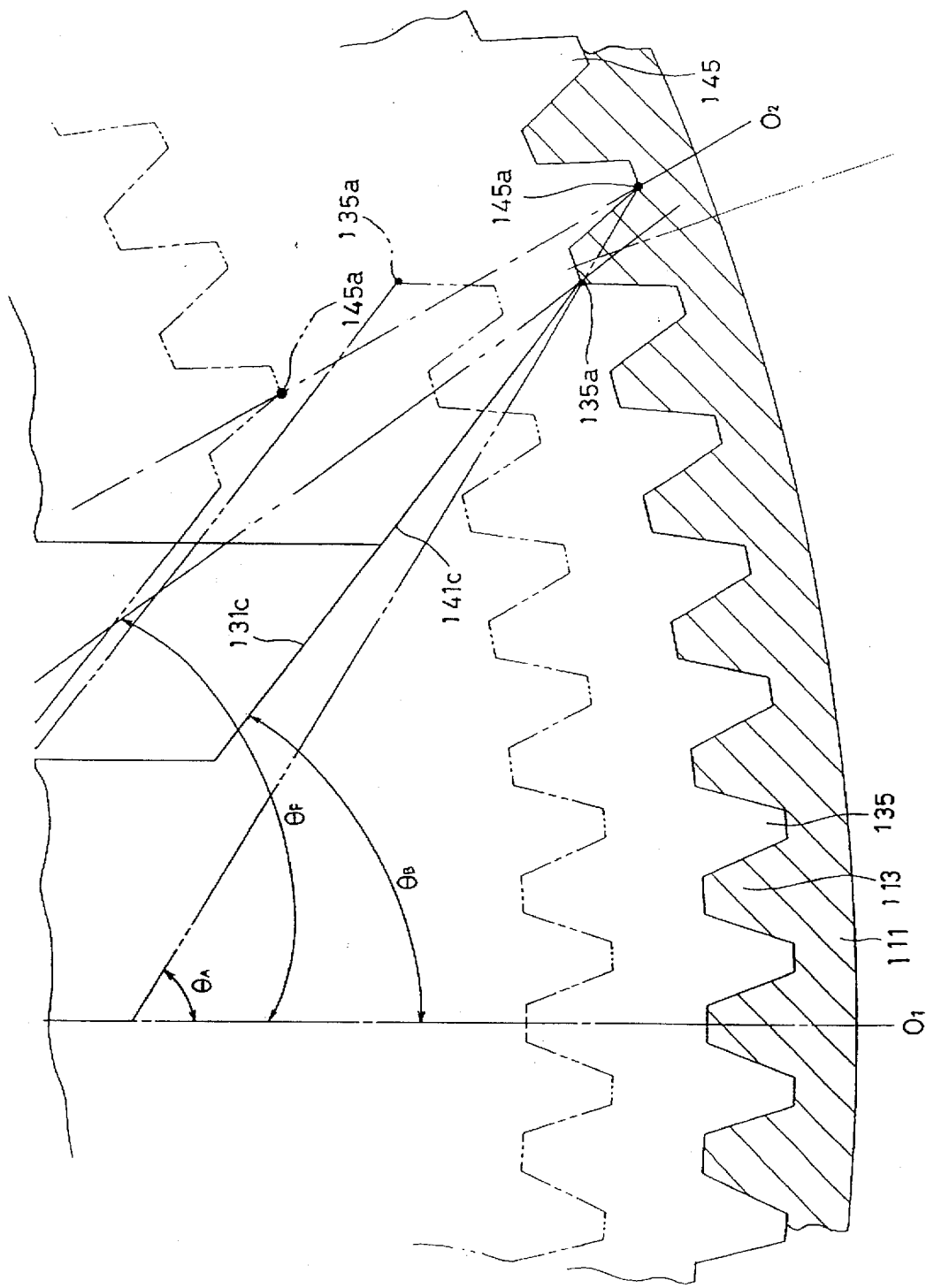
FIG. 19 is an enlarged front view for explaining the construction of the first and second inner slide cores shown in FIG. 18 in detail.

Detailed construction of the first and second inner slide cores 131, 141 will be explained with reference to FIGS. 18 and 19. FIG. 18 is an enlarged front view of the inner cores 132, 142 (the first and second inner slide cores 131, 141), FIG. 19 is a further enlarged front view of the inner cores 132, 142.

As illustrated in FIG. 18, neighboring first and second inner slide cores 131, 141 move along the first and second slide lines $O_1$ and $O_2$, respectively, and a basic configuration thereof is formed so as to be symmetrical about the slide lines $O_1$, $O_2$ which intersect the center line O.

The angle between the first and second slide lines $O_1$, $O_2$ is defined as $\theta_c$. The angle $\theta_c$ is determined by the total number of first and second inner slide cores 131, 141. In this embodiment, the number of cores 131 and 141 totals 12. Therefore, $\theta_c = 360/12 = 30$ degrees.

In order to avoid the perking surfaces 131c and 141c interfering at positions other than the closed position end nearly closed positions when the first and second inner slide cores 131 and 141 move while they are being opened and closed, the traveling velocity of the inner slide cores 131, 141 are, tan $\theta_D$, tan $\theta_E$ respectively, and the angle $\theta_c$ satisfies the following formula:

$$\tan\theta_D \leq \tan\theta_E \cdot \cos\theta_c \qquad (4)$$

The first and second inner slide cores 131, 141 contact each other on both side surfaces in the circumferential direction thereof (parting surfaces 131c, 141c) end the inner molds 131, 141 are closed when in the closed state. When measured counterclockwise from the slide line $O_1$ in the figure, the parting surfaces 131c, 141c of the first and second inner slide cores 131, 141 from the same angle $\theta_E$ with respect to the first slide line $O_1$ of the first inner slide core 131. The angle $\theta_D$ is determined in such a manner that the parting surface 141c of the second inner slide core 141 contacts the parting surface 131c of the first inner slide core 131 when the parting surface 141c proceeds along the slide line as with respect to the center line O. The parting surfaces 131c, 141c of the first and second inner are formed by slide cores 131, 141 and are symmetrical about planes formed by axially extending the slide lines $O_1$, $O_2$, respectively.

The largest angle to cause the outer teeth 135 to interfere with the mold 142 or the outer teeth 145 when the first and second inner slide cores 131, 141 move while they are being opened and closed is indicated by e $\theta_A$. The largest angle $\theta_A$ is the angle between a line which links the corner 135a of the first inner slide core 131 with the outermost top portion (corner) of the outer teeth 145, and the first slide line $O_1$ as illustrated in the figure. The largest angle $\theta_A$ varies with the position of the parting line (the position dividing the outer teeth 135, 145), but the dividing position is preferably set to be at the root, not on the surface of the tooth in order to maximize the strength thereof.

The smallest angle $\theta_E$ between the parting surfaces 131c, 141c and the first slide line $O_1$ which permits the parting surfaces 131c, 141c to be movable to the open and closed positions without interfering with each other is detained by the following formula.

$$\theta_F = \tan^{-1}(\sin\theta_c \cdot \tan\theta_E/(\tan\theta_E \cdot \cos\theta_c - \tan\theta_D)) \qquad (5)$$

In this formula, as stated above, $\theta_c$ is the angle between the slide lines $O_1$, $O_2$ of the first and second inner slide cores 131, 141; $\theta_D$ is the angle between the angular pin 127 and the center line O; and $\theta_E$ is the angle between the angular pin 128 and the center line O.

The angle $\theta_D$ between the parting surfaces 131c and 141c and the slide line $O_2$ of the first inner slide core 131 is set to be greater than the smallest angle $\theta_F$ and less than the largest angle $\theta_A$. The molds are opened and closed in synchronization with the movement of the movable plate 115 without the first the inner second slide cores 131 and 141 interfering with each other. Thus, synchronous movement occurs without the inner molds 132, 142 interfering with each other. This arrangement satisfies the formula:

$$\theta_F \leq \theta_D \leq \theta_A \qquad (6)$$

Figure 24:
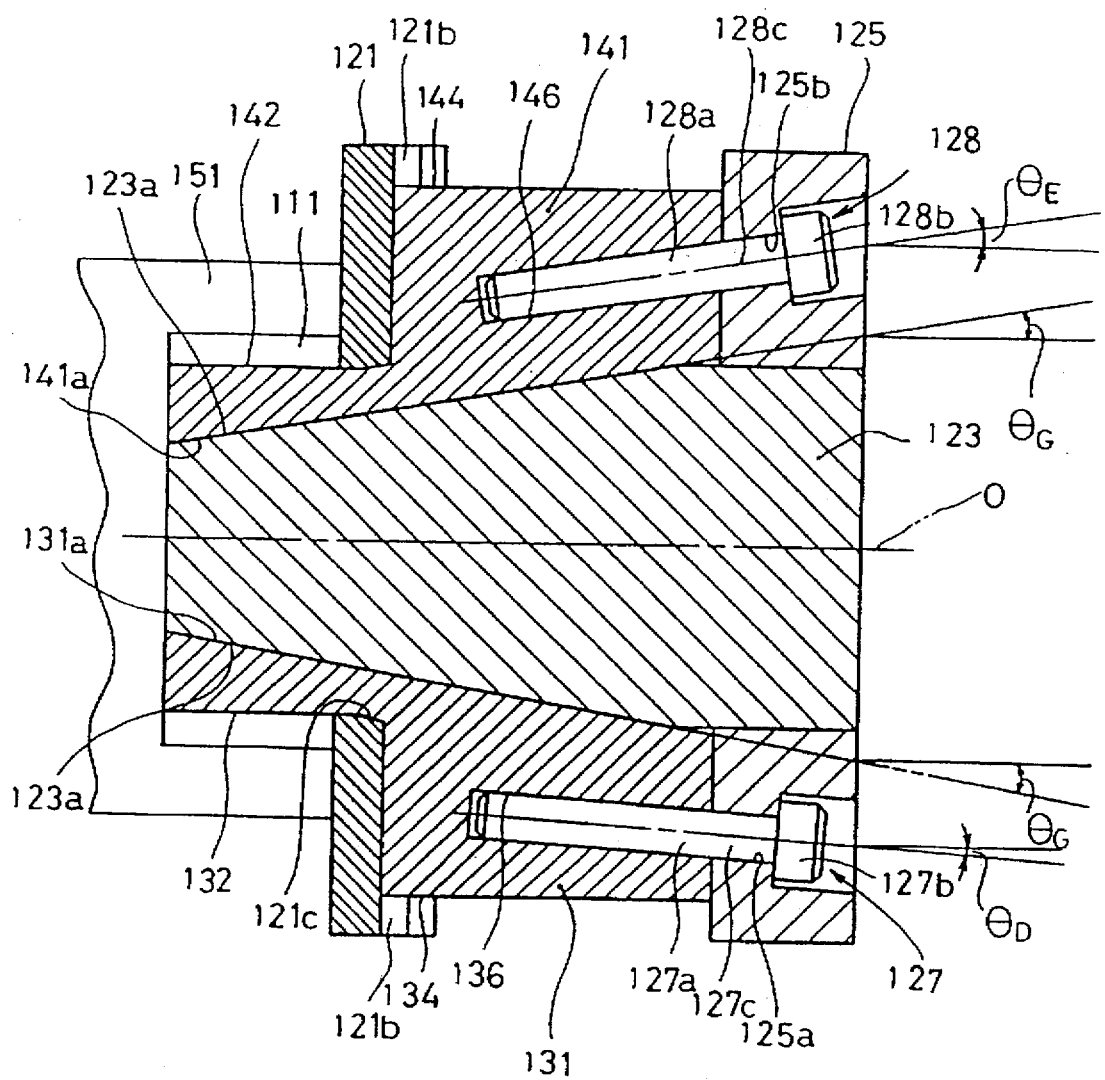
FIG. 24 is a cross-sectional view of the first and second inner slide cores according to the embodiment in a closed state which are cut by a plane in the direction that the first and second inner slide cores slide, in which the first slide cora is illustrated below the optical axis O and the second inner slide core above the optical axis O.
Figure 25:
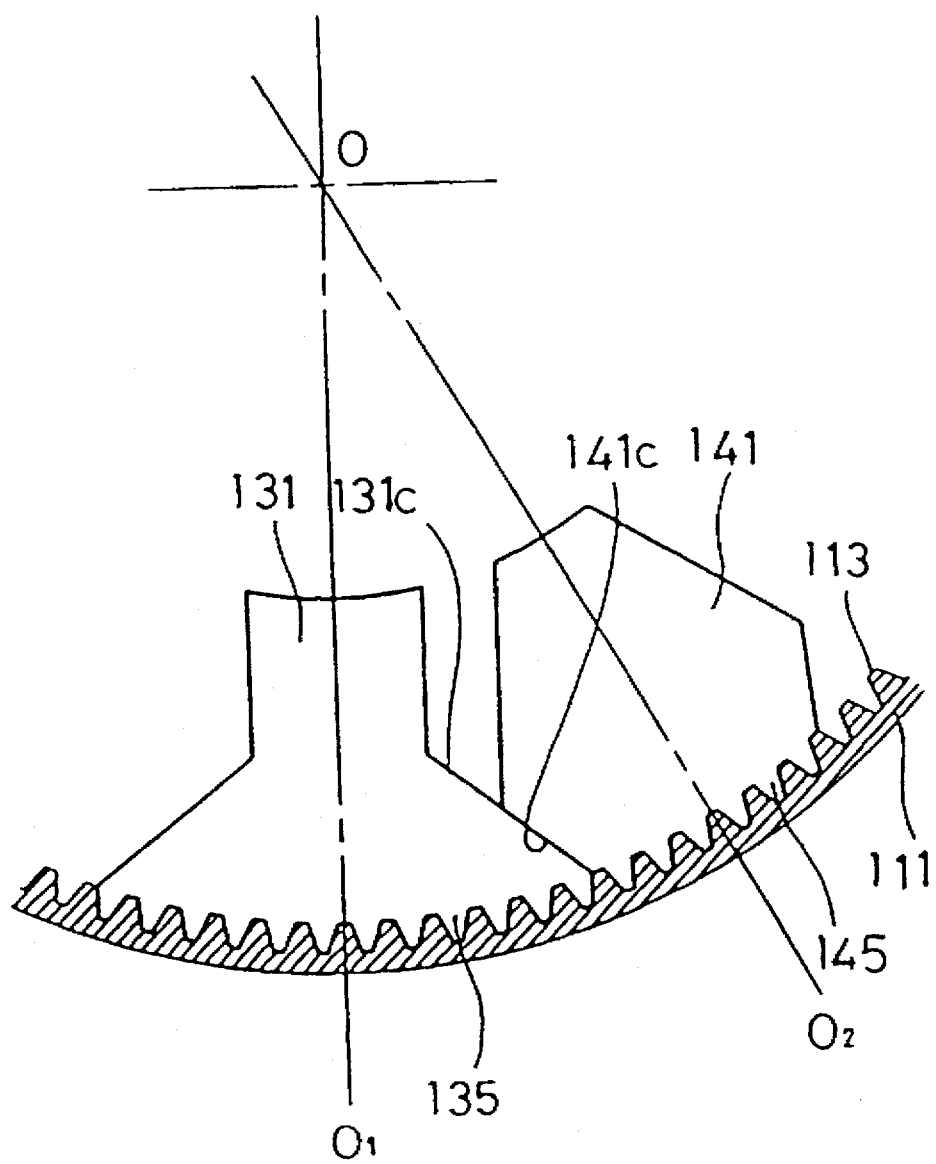
FIG. 25 is a front view of the first and second inner slide cores for explaining the relationship in position between the two in a closed state.
Figure 26:
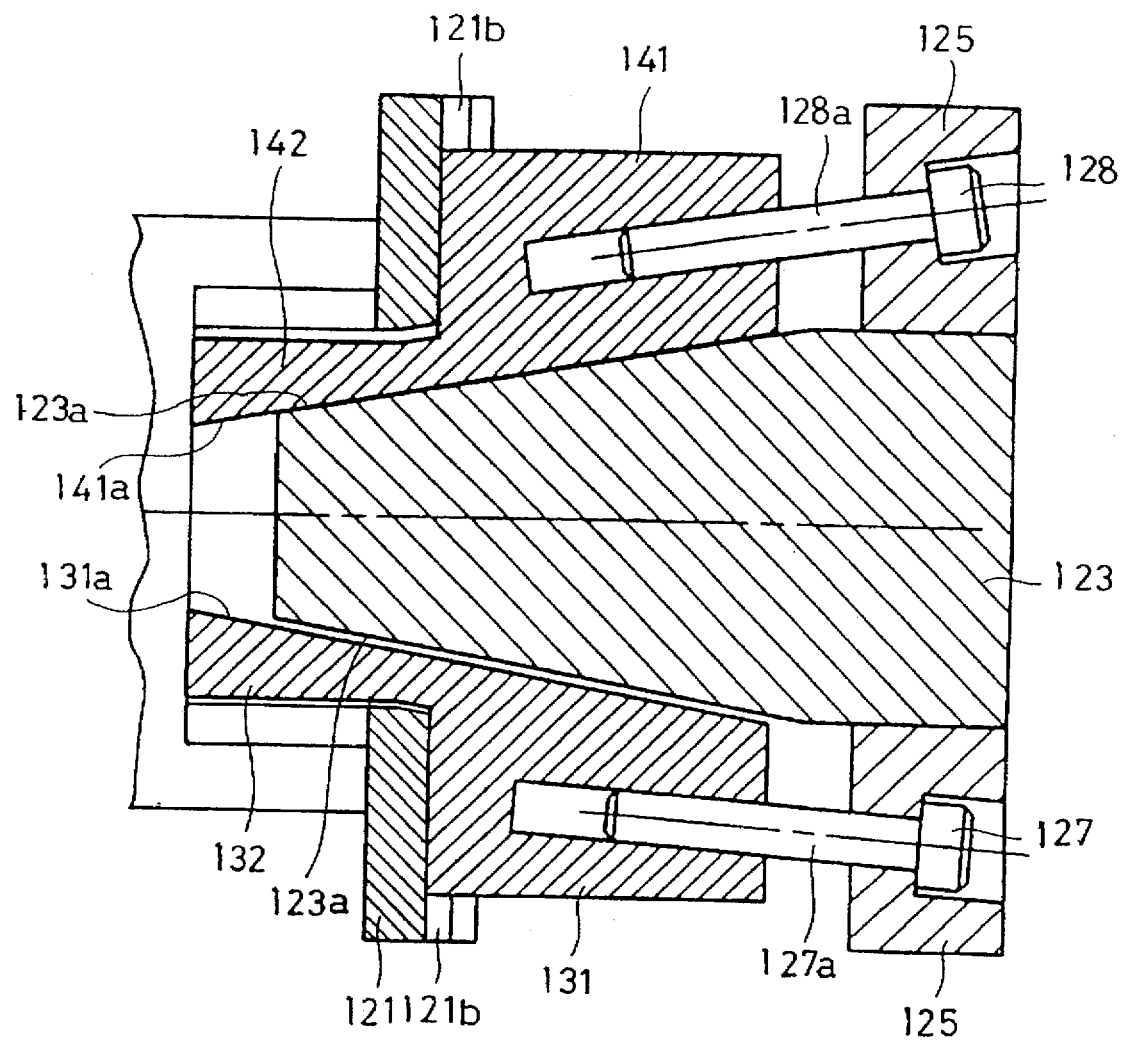
FIG. 26 is a cross-sectional view of the first and second inner slide cores according to the embodiment in an intermediate state which is between a closed stats and an open state which are shown sectioned in a plane in the direction that the first and second inner slide cores slide, in which the first slide core is illustrated below the optical axis O and the second inner slide core is above the optical axis O.
Figure 27:
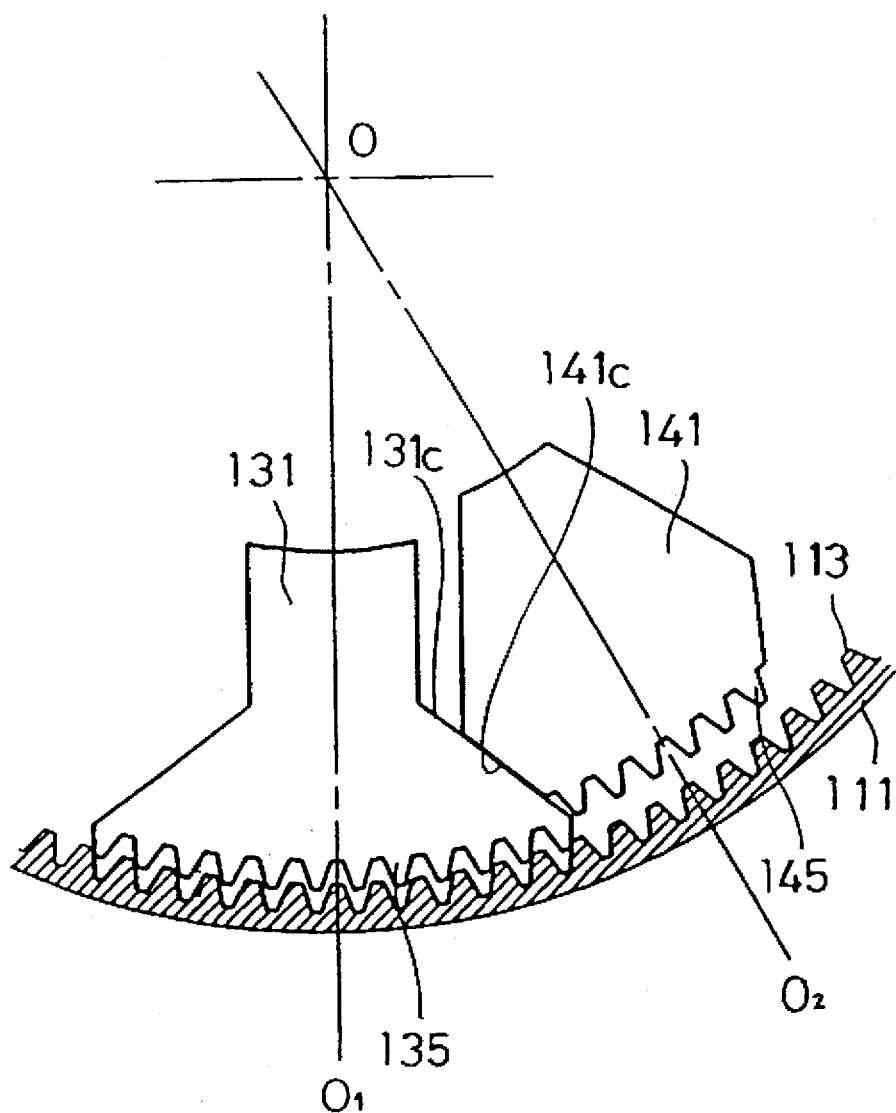
FIG. 27 is a front view of the first and second inner slide cores for explaining the relationship in the position of the first and second inner slides when in the intermediate state which is between the closed and open states as shown in FIG. 26.
Figure 28:
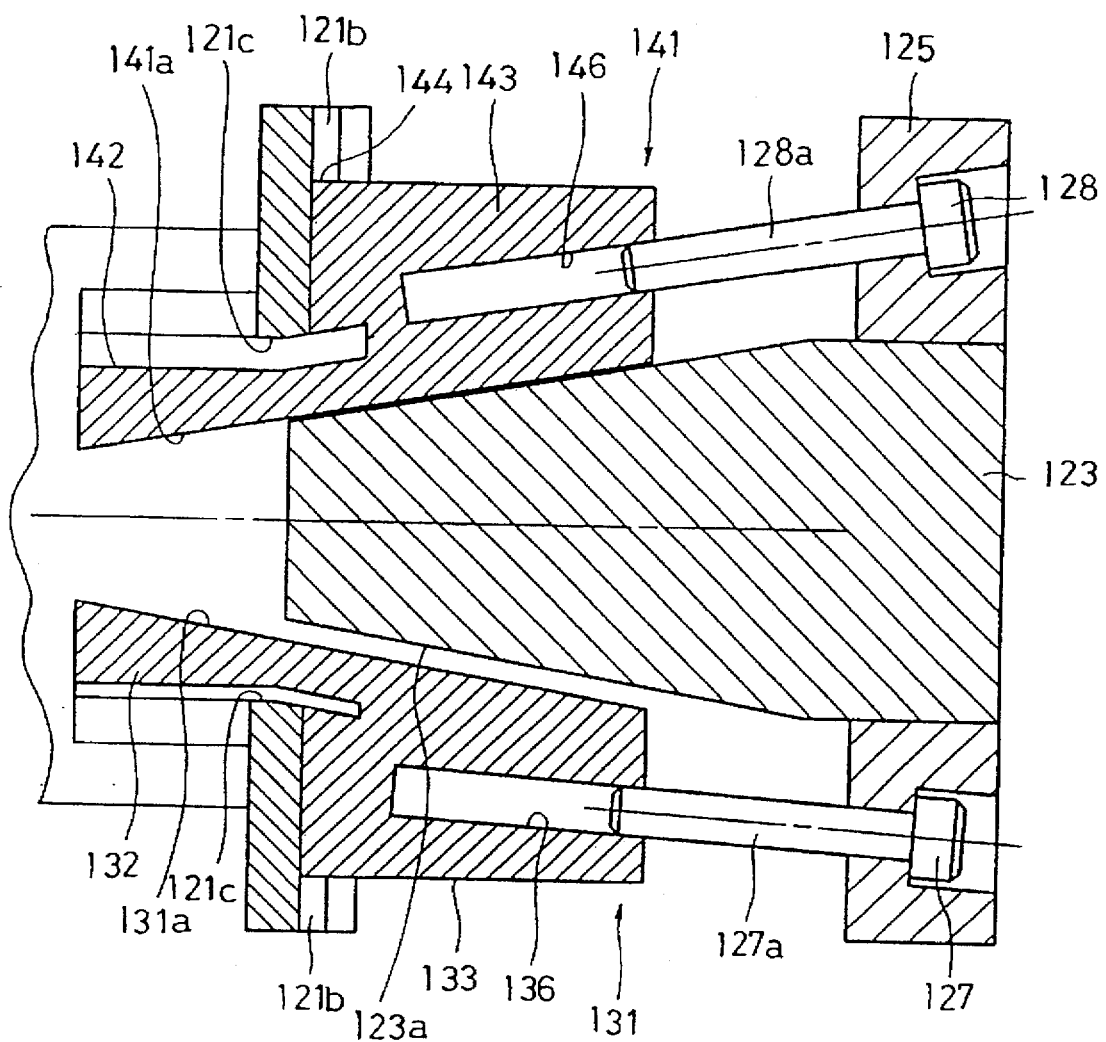
FIG. 28 is a cross-sectional view of the first and second inner slide cores according to the embodiment in in the open state which are cut by a plane in the direction that the two inner slide cores slide, in which the first slide core is illustrated below the optical axis O and the second inner slide core above the optical axis O.
Figure 29:
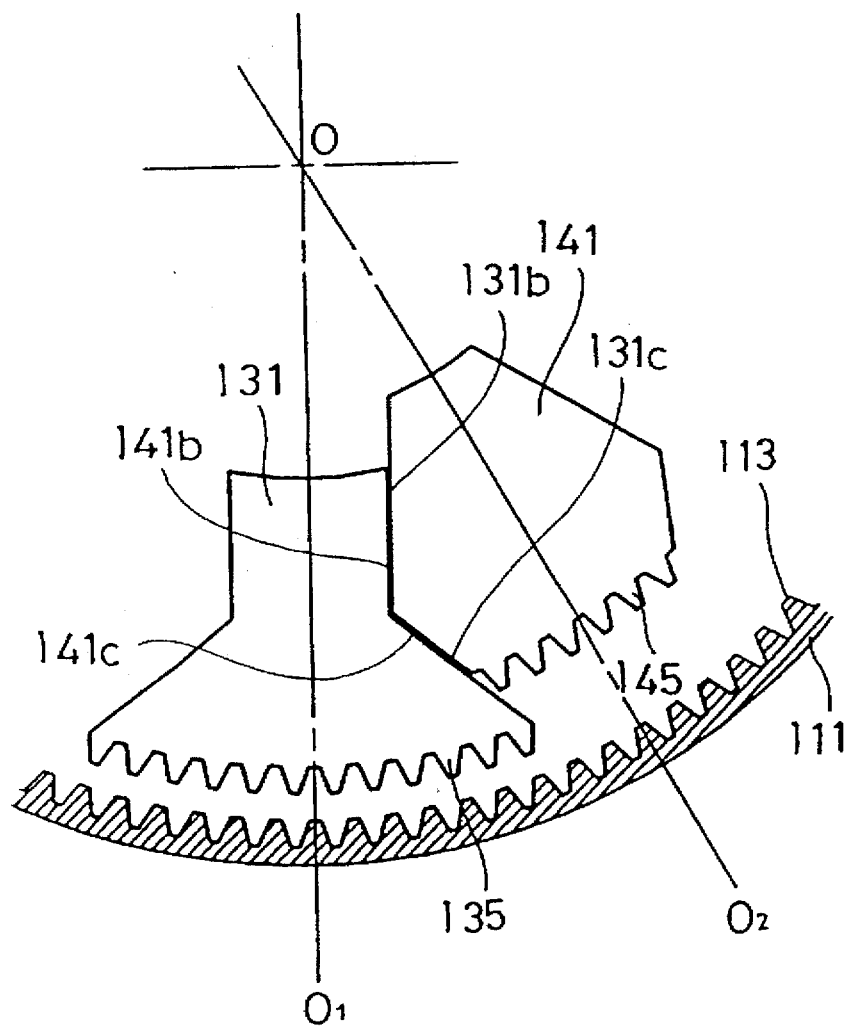
FIG. 29 is a front view of the first and second inner slide cores for explaining their relationship in position with respect to each other when in the open state as shown in FIG. 28.

The opening and closing of time first and second inner slide cores 131, 141 will be further explained in detail with reference to FIG. 24 to 29. FIGS. 25, 27 and 29 are front views of the first and second inner slide cores 131, 141 for explaining the relationship between the two. FIGS. 24, 26 and 28 are cross-sectional views of the inner slide cores 131, 141 shown in FIGS. 25, 27 and 29, which are taken along a plane passing through the slide lines $O_1$, $O_2$. The first inner slide core 131 is illustrated over the center line and the second inner slide core 141 below the center line.

In the closed state in which the inner cores 132, 142 closely contact each other, the lock core 123 proceeds to cause the tapered portion 123a thereof to abut the inner peripheral surfaces 131a, 141a of the first and second inner slide cores 131, 141 and to press them toward the closed position (outwards). The inner slide cores 131, 141, being subjected to the pressure are pushed into the closed position (outwards) along the guide grooves 112b. The parting surfaces 131c, 141c closely contact each other to close the inner molds 132, 142, as illustrated in FIGS. 20, 22, 24 and 25.

In the closed state, the outer metal mold 151 is engaged with the inner molds 132, 142, A cavity for forming the cam ring 111 is provided by the outer peripheral surfaces of the inner molds 132, 142, the inner peripheral surface of the outer metal mold 151, and the front faces of the fixed plate 121. Synthetic resin is injected into the cavity through an injection plunger or the like and is solidified or hardened to form the cam ring 111.

To extract the formed cam ring 111, the movable plate 125 is retracted from the closed state and the lock core 123 and the angular pins 127, 128 are simultaneously retracted, permitting the first and second inner slide cores 131, 141, that is, the inner molds 132, 142 to be disengaged from the tapered portion 123a and opened (moved in the direction toward the center line O). Further, the angular pins 127, 128 are simultaneously retracted so that the inner molds 132, 142 move in the open direction while being restricted by the angular pins 127, 128. Than, the inner molds 132, 142 are separated from the inner teeth 113 and the inner molds 132, 142 are separated from each other as illustrated in FIGS. 26 and 27.

Referring to FIGS. 21, 23, 28 and 29, about the time when the movable plate 27 is further retracted and reaches the open position, the outer gear portions 135, 145 of the inner molds 132, 142 are fully withdrawn from the inner teeth 113 of the cam ring 111 to permit the cam ring 111 to he removed. In this open state, the outer molds 151 are separated from each other to remove the cam ring 111 and the cam ring 111 is withdrawn from the outer metal molds 151. In this open state, planes 131b, 141b linking the inclined surfaces 131a, 141a and the parting surfaces 131c, 141c of the first and second inner slide cores 131, 141 come closest to each other. It is needless to say that the shape of the planes 131b and 141b are formed in such a manner that they do not interfere with each other while the first and second inner slide cores 131. 141 travel between the closed and open positions. In case the cam ring 111 is also provided with undercuts on the outer peripheral surface thereof, the outer metal mold 151 is also divided.

As described above, with the mold used for the injection molding machine according the embodiment of the present invention, only the back and forth movement of the movable plate 125 causes the first and second inner slide cores 131, 141 to move in the direction that they are opened and closed without interfering with each other at different velocities. As a result, a cylindrical product with undercuts at the inner peripheral surfaces thereof such as the cam ring 111 is easily formed through injection molding with simple construction and control.

In this embodiment, the explanation was made when the cam ring 111 is formed as a product with undercuts made by injection molding, it is obvious that the present invention is applicable to products other than the cam ring 111.

Further, in this embodiment, the number of inner teeth 113 of the cam ring 111 is determined based on the number of divided inner molds, which permits each of the inner molds to be made as a standard configuration to simplify the construction of the mold as well as the driving means for opening and closing the mold. Moreover, with the above-mentioned construction, parting lines are formed at roots of the outer teeth 135o 145 for easily forming the inner teeth 113.

Where the number of divided inner slide cores 131, 141 is S; and the number of teeth of the inner gear is Z, Z is determined by the following formula, Z=(S/2)·n, (where n is a positive integer). Generally, the value of n is selected from even numbers in consideration of gears meshing with the inner gear 113 in this embodiment as discussed above.

Further, in this embodiment, the number of teeth Z in the above-mentioned formula is an integer since a plurality of sets of inner molds are adopted as the first and second inner slide cores 131, 141 constituting a set of inner molds. It is possible to preferentially determine the number of teeth Z, however, the quotient of the above formula is not always be an integer. In such a case, some sets of the first end second inner slide cores 131, 141 are adjusted to properly shape the mold.

In this embodiment, the cam ring 111 and a metal mold for forming the cam ring 111 are explained as an example of a product made by injection molding with an inner gear. However, it is needless to say that the present invention is applicable to products with an inner gear other than the cam ring 111 formed in a metal mold through injection molding.

Further, in the embodiment described above, the tooth shape 113a of the inner gear 113 of the cam ring 111 is linearly formed so as not to be interfered with by the path of the outer teeth 135, 145 forming the inner gear 113 in the direction in which the outer teeth 135, 145 move. This allows the inner molds 132, 142 to be radially withdrawn. As a result, it is possible to manufacture products with undercuts where the inner molds 132, 142 can not be withdrawn in a direction parallel to the center line O through injection molding.

In this embodiment, the cam ring 111 and a metal mold for forming the cam ring 111 are explained as an example of a product with an inner gear made by injection molding. However, it is needless to say that the present invention is applicable to a product with an inner gear other than the cam ring 111 formed in a metal mold through injection molding.

As can be clearly understood from the above explanation, in the present invention, the angle $\theta_D$ between the parting surfaces 131c and 114c and the slide line of the-first inner slide core 131 is set to be larger than the smallest angle $\theta_F$ to prevent the parting surfaces of the first and second inner slide cores from interfering with each other at positions other than the closed position and the nearly closed positions. Angle $\theta_D$ is set to be smaller than the largest angle $\theta_A$ with respect to the direction of the movement of the first slide core to prevent the undercuts of the second inner slide core from interfering with the first inner slide core when the first and second inner slide cores travel when they are being opened and closed. The inner slide cores are driven while they are being opened and closed without the use of a special control means, resulting in a simple control means for the injection molding machine and the construction of driving means.

Further, in this invention, the number of teeth of the inner gear which are formed by the injection molding metal mold with a plurality of inner slide cores radially moving for opening and closing the inner molds is determined based on the number of divided inner slide cores. This permits the parting lines of the inner molds for forming the inner teeth to be positioned at the roots of the teeth, resulting in a considerably simpler mold construction. Moreover, the construction and control means of a driving means for opening and closing the mold is also simplified.

Further, in the present invention, the shape of a tooth of an inner gear which is formed by a mold for injection molding with a plurality of inner slide cores radially moving for opening and closing the inner mold is formed so as not to interfere with the inner slide cores when the inner slide cores moved while they are opened and closed. Thus, it is possible to form the inner gear while the inner molds are radially moved. As a result, a product with an inner gear having undercuts other than the inner gear at the inner periphery thereof, in which the inner molds cannot be withdrawn in a direction parallel to the axis of the gear, can also be formed by injection molding by utilizing the present invention.

What is claimed is:

1. A molded product comprising:
   a cylindrical base member;
   a spiral inner gear formed on an inner peripheral surface of said cylindrical base member so as to be inclined with respect to a circumferential direction of said cylindrical base member; and,
   a spiral relief groove formed on said inner peripheral surface of said cylindrical base member adjacent to said spiral inner gear, said spiral relief groove having a radius from a center of said cylindrical base member to a bottom of said spiral relief groove greater than a radius of a dedendum circle of said spiral inner gear; and
   said spiral relief groove having a width that is wider than a tooth width of said spiral inner gear.

2. A mold for forming said product of claim 1, comprising an upper mold for forming an outer surface of said product and a lower mold for forming an inner surface of said product, said lower mold including a first cylindrical mold with a spiral toothed portion for said spiral inner gear; and a second cylindrical mold with a spiral flat portion for said spiral relief groove.

3. The molded product of claim 1, further comprising a spiral lead groove formed on said inner peripheral surface of said cylindrical base member so as to be parallel to said spiral inner gear.

4. A mold for forming said product of claim 3, comprising an upper mold for forming an outer surface of said product and a lower mold for forming an inner surface of said product, wherein said lower mold includes: a first cylindrical mold with a spiral toothed portion for said spiral inner gear; and a second cylindrical mold with a spiral flat portion for said spiral relief groove and with a spiral protrusion for said lead groove.

5. The mold of claim 4, wherein said first cylindrical mold comprises: a cylindrical portion with a small diameter; and a spiral portion with a diameter larger than that of said cylindrical portion with a small diameter, said toothed portion being formed on an outer periphery of said spiral portion, and wherein said second cylindrical mold includes: a hole at a center thereof for engaging said cylindrical portion with said small diameter; and a spiral groove for accommodating said spiral toothed portion.

6. An inner gear formed by a mold for injection molding with a plurality of inner slide cores which radially move to open and close inner molds, wherein a number of teeth of said inner gear is determined by a number of divided inner slide cores so as to satisfy the formula:

$$Z = (S/2) \cdot n$$

where S represents a number of divided inner slide cores; Z represents a number of teeth of said inner gear; and n represents a positive integer.

7. The inner gear of claim 6, said inner slide cores include a plurality of sets of first and second inner slide cores, and wherein one set of said plurality sets of first and second inner slide cores comprises first and second inner slide cores which are adjacent to each other and radially move at different velocities with respect to each other to open and close said inner molds.

8. An inner gear integrally formed on a cylindrical member, said inner gear being formed by an injection molding mold comprising:

a plurality of inner slide cores and a plurality of inner molds;

said inner molds being integrally formed with said inner slide cores, and said inner molds being radially movable to open and close said injection molding mold;

said inner molds comprising tooth forming portions, for forming teeth of said inner gear, said tooth forming portions being positioned such that when said inner molds radially move from a closed position to an open position, said formed teeth do not interfere with radial movement of said inner molds.

9. The inner gear of claim 8, said tooth forming portion of said inner molds forming said teeth of said inner gear with an involute tooth form.

10. The inner gear of claim 8, said tooth forming portion of said inner molds forming said teeth of said inner gear to extend in a direction parallel to said inner gear, and forming at least one surface of said teeth of said inner gear to be substantially flat.

11. The inner gear of claim 8, wherein said tooth form of said inner gear is formed by lines resembling an involute.

12. The inner gear of claim 8, wherein said tooth form of said inner gear extends in a direction parallel to an axis of said inner gear, and wherein a surface of said tooth form is substantially flat.

* * * * *